US012418119B2

(12) United States Patent
Park et al.

(10) Patent No.: US 12,418,119 B2
(45) Date of Patent: Sep. 16, 2025

(54) ANTENNA ASSEMBLY AND ELECTRONIC DEVICE INCLUDING SAME

(71) Applicant: Samsung Electronics Co., Ltd., Suwon-si (KR)

(72) Inventors: Sanghoon Park, Suwon-si (KR); Jungho Park, Suwon-si (KR); Kwanghyun Baek, Suwon-si (KR); Youngju Lee, Suwon-si (KR); Jungyub Lee, Suwon-si (KR); Juneseok Lee, Suwon-si (KR); Dohyuk Ha, Suwon-si (KR); Jinsu Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 18/152,311

(22) Filed: Jan. 10, 2023

(65) Prior Publication Data

US 2023/0163488 A1 May 25, 2023

Related U.S. Application Data

(63) Continuation of application No. PCT/KR2022/015550, filed on Oct. 14, 2022.

(30) Foreign Application Priority Data

Oct. 19, 2021 (KR) ........................ 10-2021-0139564
Jan. 25, 2022 (KR) ........................ 10-2022-0011067

(51) Int. Cl.
*H01Q 21/30* (2006.01)
*H01Q 1/24* (2006.01)

(52) U.S. Cl.
CPC ............... *H01Q 21/30* (2013.01); *H01Q 1/24* (2013.01)

(58) Field of Classification Search
CPC ................................ H01Q 21/30; H01Q 1/24
See application file for complete search history.

(56) References Cited

U.S. PATENT DOCUMENTS 5,444,453 A 8/1995 Lalezari
9,620,464 B2 4/2017 Baks et al.
(Continued)

FOREIGN PATENT DOCUMENTS

CN 109075441 A 12/2018
CN 110401005 A 11/2019
(Continued)

OTHER PUBLICATIONS

International Search Report dated Feb. 3, 2023, issued in International Application No. PCT/KR2022/015550.
(Continued)

*Primary Examiner* — Graham P Smith
(74) *Attorney, Agent, or Firm* — Jefferson IP Law, LLP

(57) ABSTRACT

An antenna assembly is provided. The antenna assembly includes a first flexible printed circuit board (FPCB) for multiple first antennas, a second flexible printed circuit board (FPCB) for multiple second antennas, a metal plate including multiple holes, a first adhesive material layer for bonding between the metal plate and the first FPCB, and a second adhesive material layer for bonding between the metal plate and the second FPCB, wherein the metal plate is disposed such that the multiple first antennas are located in the multiple holes, respectively and the multiple second antennas to be located in the multiple holes, respectively.

20 Claims, 17 Drawing Sheets

(56) References Cited

U.S. PATENT DOCUMENTS

| | | | |
|---|---|---|---|
| 10,211,525 | B2 | 2/2019 | Clark et al. |
| 10,490,479 | B1 | 11/2019 | Wan et al. |
| 10,615,511 | B2 | 4/2020 | Labonte et al. |
| 10,797,405 | B1 | 10/2020 | Baek et al. |
| 10,854,979 | B2 | 12/2020 | Sakurai |
| 10,886,606 | B2 | 1/2021 | Kamgaing et al. |
| 10,950,949 | B2 | 3/2021 | Jeon et al. |
| 11,251,538 | B2 | 2/2022 | Lee et al. |
| 11,502,400 | B2 | 11/2022 | Bulumulla et al. |
| 2003/0067410 | A1 | 4/2003 | Puzella et al. |
| 2012/0018186 | A1 | 1/2012 | Koo et al. |
| 2017/0271772 | A1 | 9/2017 | Miraftab et al. |
| 2018/0159203 | A1 | 6/2018 | Baks et al. |
| 2020/0093006 | A1 | 3/2020 | Tseng et al. |
| 2020/0161766 | A1 | 5/2020 | Liu et al. |
| 2021/0216112 | A1 | 7/2021 | Shin et al. |
| 2021/0313694 | A1 | 10/2021 | Lim et al. |

FOREIGN PATENT DOCUMENTS

| | | | |
|---|---|---|---|
| EP | 3 723 192 | A1 | 10/2020 |
| EP | 4 243 202 | A1 | 9/2023 |
| JP | H11-186838 | A | 7/1999 |
| KR | 10-2012-0009872 | A | 2/2010 |
| KR | 10-2018-0122286 | A | 11/2018 |
| KR | 10-2019-0030311 | A | 3/2019 |
| KR | 10-2019-0093195 | A | 8/2019 |
| KR | 10-2020-0037953 | A | 4/2020 |
| KR | 10-2021-0011484 | A | 2/2021 |
| KR | 10-2021-0123032 | A | 10/2021 |

OTHER PUBLICATIONS

European Search Report dated Nov. 13, 2024, issued in European Application No. 22883883.5.

ANTENNA ASSEMBLY AND ELECTRONIC DEVICE INCLUDING SAME

CROSS-REFERENCE TO RELATED APPLICATION(S)

This application is a continuation application, claiming priority under § 365 (c), of an International application No. PCT/KR2022/015550, filed on Oct. 14, 2022, which is based on and claims the benefit of a Korean patent application number 10-2021-0139564, filed on Oct. 19, 2021, in the Korean Intellectual Property Office, and of a Korean patent application number 10-2022-0011067, filed on Jan. 25, 2022, in the Korean Intellectual Property Office, the disclosure of each of which is incorporated by reference herein in its entirety.

TECHNICAL FIELD

The disclosure relates to a wireless communication system. More particularly, the disclosure relates to an antenna assembly and an electronic device including the same in a wireless communication system.

BACKGROUND ART

To meet the increased demand for wireless data traffic since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency (millimeter (mm) Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-Points (COMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There has been development of products equipped with multiple antennas to improve communication performance, and it is expected that equipment having far more antennas will be used. As more antenna elements are used for communication devices, there is an increasing demand for an antenna structure for reducing performance degradation during fabrication and assembling processes.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an antenna module and an electronic device including the same, wherein in connection with a dual antenna structure in which antennas are disposed on two different layers while being spaced apart, an adhesive material is disposed between a metal substrate and an antenna substrate, thereby improving antenna assembly assembling performance.

Another aspect of the disclosure is to provide an antenna module and an electronic device including the same, wherein antennas are positioned within a layer of a metal substrate in connection with a dual antenna structure in a wireless communication system, thereby providing a high level of antenna performance.

Additional aspects will be set forth in part in the description which follows and, in part, will be apparent from the description, or may be learned by practice of the presented embodiments.

Technical Solution

In accordance with an aspect of the disclosure, an antenna assembly is provided. The antenna assembly includes a first flexible printed circuit board (FPCB) for multiple first antennas, a second flexible printed circuit board (FPCB) for multiple second antennas, a metal plate including multiple holes, a first adhesive material layer for bonding between the metal plate and the first FPCB, and a second adhesive material layer for bonding between the metal plate and the second FPCB, wherein the metal plate is disposed such that the multiple first antennas are located in the multiple holes, respectively and the multiple second antennas are located in the multiple holes, respectively.

In accordance with another aspect of the disclosure, a radio unit (RU) module is provided. The RU module includes a printed circuit board (PCB), and multiple antenna assemblies, wherein an antenna assembly of the multiple antenna assemblies includes a first flexible printed circuit board (FPCB) for multiple first antennas, a second flexible printed circuit board (FPCB) for multiple second antennas, a metal plate including multiple holes, a first adhesive material layer for bonding between the metal plate and the first FPCB, and a second adhesive material layer for bonding between the metal plate and the second FPCB, and wherein the metal plate is disposed such that the multiple first antennas are located in the multiple holes, respectively and the multiple second antennas are located in the multiple holes, respectively.

Advantageous Effects

A device and a method according to embodiments of the disclosure improve assembling performance through an adhesive material disposed on an antenna substrate and a metal substrate layer, thereby enabling stable large antenna design.

In addition, a device and a method according to embodiments of the disclosure enable integration of multiple antennas such that a high level of antenna performance can be provided.

In addition, a device and a method according to embodiments of the disclosure make it possible to efficiently fabricate an antenna assembly through an easily attachable/detachable adhesive material.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

As used in the description below, the terms indicating components of an electronic device (e.g., "filter", "amplifier", "printed circuit board (PCB)", "flexible PCB (FPCB)", "antenna element", "compensation circuit", "processor", "chip", "element", and "device"), the terms indicating the shape of a component (e.g., "structure", "assembly", "connection part", "contact part", "guide part", "protrusion", and "stator"), the terms indicating a connection part between structures (e.g., "connection part", "contact part", "contact element", "contact structure", "contact terminal", "connection element", "boss", "conductive member", and "assembly"), the terms indicating a circuit (e.g., "printed circuit board (PCB)", "flexible PCB (FPCB)", "signal line", "data line", "feeding line", "feeding part", "RF signal line", "antenna cable", "RF path", "RF module", "RF circuit", "RFA", and "RFB"), etc. are provided as examples for the convenience of description. Therefore, the disclosure is not limited to the terms used below, and other terms having the same technical meaning may be used. Further, the terms "unit", "device", "member", "body", etc. used hereinafter may indicate at least one shape structure or may indicate a unit for processing a function.

Figure 1:
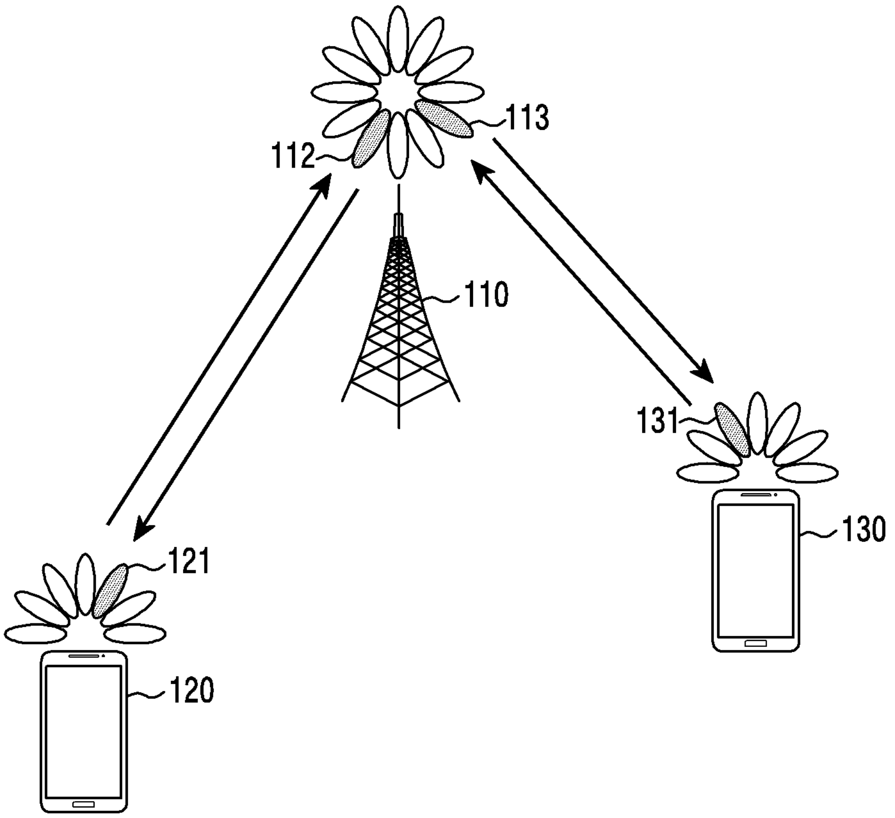
FIG. 1 illustrates a wireless communication system according to an embodiment of the disclosure.

FIG. 1 illustrates a wireless communication system according to an embodiment of the disclosure.

Referring to FIG. 1, a wireless communication environment 100 of includes a base station 110 and a terminal 120 as examples of nodes using a wireless channel.

The base station 110 is a network infrastructure that provides a wireless connection to the terminal 120. The base station 110 has a coverage defined as a certain geographic area based on a distance through which a signal can be transmitted. In addition to the base station, the base station 110 may be referred to as a massive multiple input multiple output (MMU) unit, an "access point (AP)", an "eNodeB (eNB)", a "5th generation node (5G node)", a 5G NodeB (NB), a "wireless point", a "transmission/reception point (TRP)", an "access unit", a "distributed unit (DU)", a "radio unit (RU)", a "remote radio head (RRH)", or other terms with equivalent technical meanings. The base station 110 may transmit a downlink signal or may receive an uplink signal.

The terminal 120 is a device used by a user, and performs communication with the base station 110 through a wireless channel. In some cases, the terminal 120 may be operated without the user's involvement. The terminal 120 may be a device that performs machine type communication (MTC) and need not be carried by a user. The terminal 120 may be referred to as "user equipment (UE)", a "mobile station", a "subscriber station", "customer premises equipment (CPE)", a "remote terminal", a "wireless terminal", an "electronic device", a "terminal for vehicle", a "user device", or other terms with equivalent technical meanings.

The terminal 120 and the terminal 130 shown in FIG. 1 may support vehicle communication. In a case of vehicle communication, the standardization of vehicle-to-everything (V2X) technology has been completed in third generation partnership project (3GPP) release 14 and release 15 based on a device-to-device (D2D) communication structure in an LTE system, and efforts are currently underway to develop a V2X technology based on 5G new radio (NR). The NR V2X supports broadcast communication, groupcast (or multicast) communication, and unicast communication between terminals.

A beamforming technology is used as one of technologies for reducing propagation path loss and increasing a radio propagation distance. Generally, beamforming uses multiple antennas to concentrate the arrival area of radio waves, or increase the directivity of reception sensitivity in a specific direction. Therefore, communication equipment may include multiple antennas to form a beamforming coverage instead of forming a signal in an isotropic pattern by using a single antenna. Hereinafter, an antenna array including multiple antennas will be described.

The base station 110 or the terminal 120 may include an antenna array 112, 113, 121, and 131. Each antenna included in an antenna array may be referred to as an array element or an antenna element. Hereinafter, an antenna array is described as a two-dimensional planar array in the disclosure, but this is merely an embodiment and does not limit other embodiments of the disclosure. An antenna array may be configured in various forms such as a linear array or a multi-layer array. An antenna array may be referred to as a massive antenna array.

A main technology to improve the data capacity of 5G communication is a beamforming technology using an antenna array connected to multiple RF paths. The number of components for performing wireless communication has been increased to improve communication performance. Particularly, the number of antennas, RF parts (e.g., an amplifier and a filter) for processing an RF signal received or transmitted through an antenna, and the number of components has been increased and thus a spatial gain and cost efficiency are essentially required in configuring a communication device in addition to satisfying communication performance.

Figure 2A:
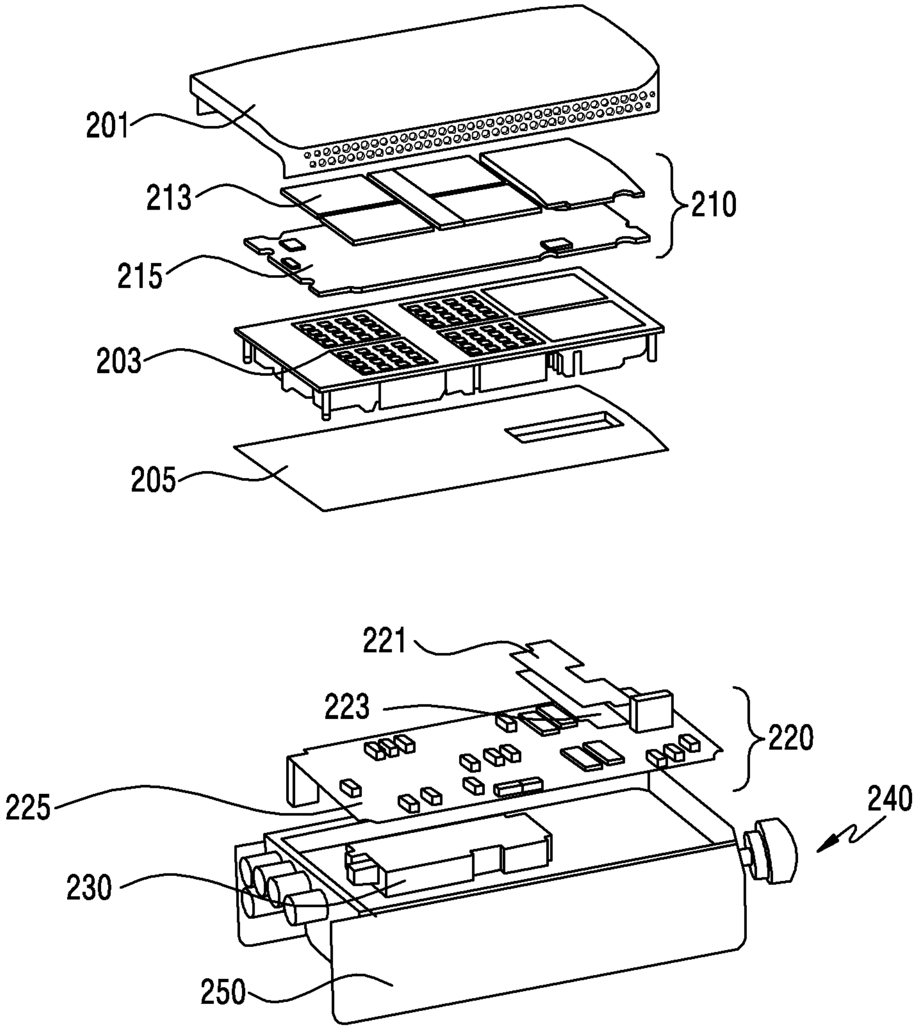
FIGS. 2A and 2B illustrate an example of components of an electronic device according to various embodiments of the disclosure.
Figure 2B:
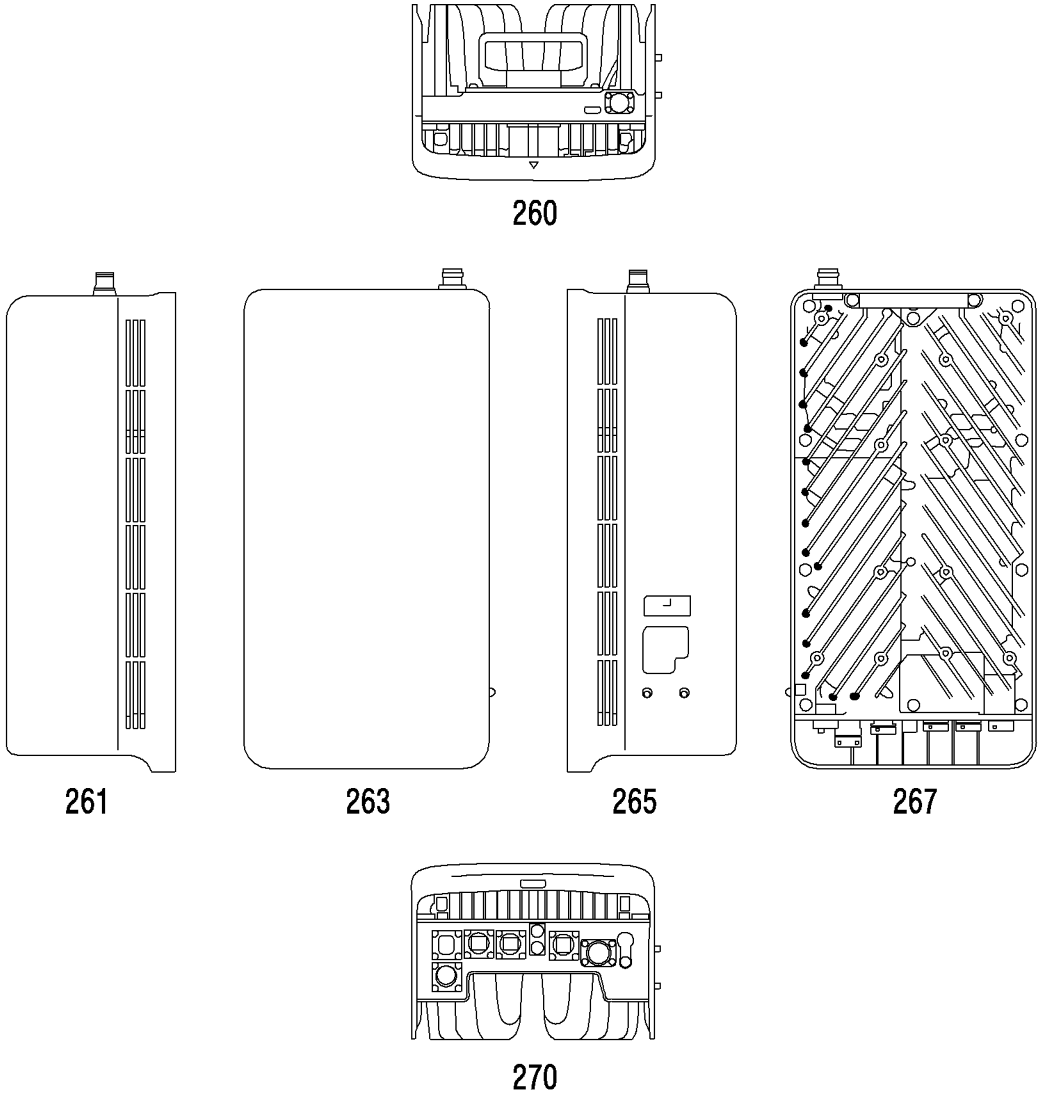

FIGS. 2A and 2B show an example of components of an electronic device according to various embodiments of the disclosure. FIG. 2A shows internal components constituting an electronic device and FIG. 2B shows an upper surface, a lower surface, and a lateral surface of an electronic device.

Referring to FIG. 2A, the electronic device may include a radome cover 201, an RU housing 203, a DU cover 205 and an RU 210. The RU 210 may include an antenna module and RF components for the antenna module. The RU 210 may include an antenna module 213 having an air-based feeding structure according to embodiments of the disclosure to be described below. The antenna module may include a ball grid array (BGA) module antenna. The RU 210 may include an RU board 215 to which RF components are mounted.

The electronic device may include a DU 220. The DU 220 may include an interface board 221, a modem board 223, and a CPU board 225. The electronic device may include a power module 230, a GPS 240, and a DU housing 250.

FIG. 2B shows a drawing 260 of the electronic device viewed from the top. A drawing 261, drawing 263, drawing 265, and drawing 267 show figures of the electronic device viewed from the left, front, right, and rear side, respectively. Drawing 270 shows the electronic device viewed from below.

Figure 3A:
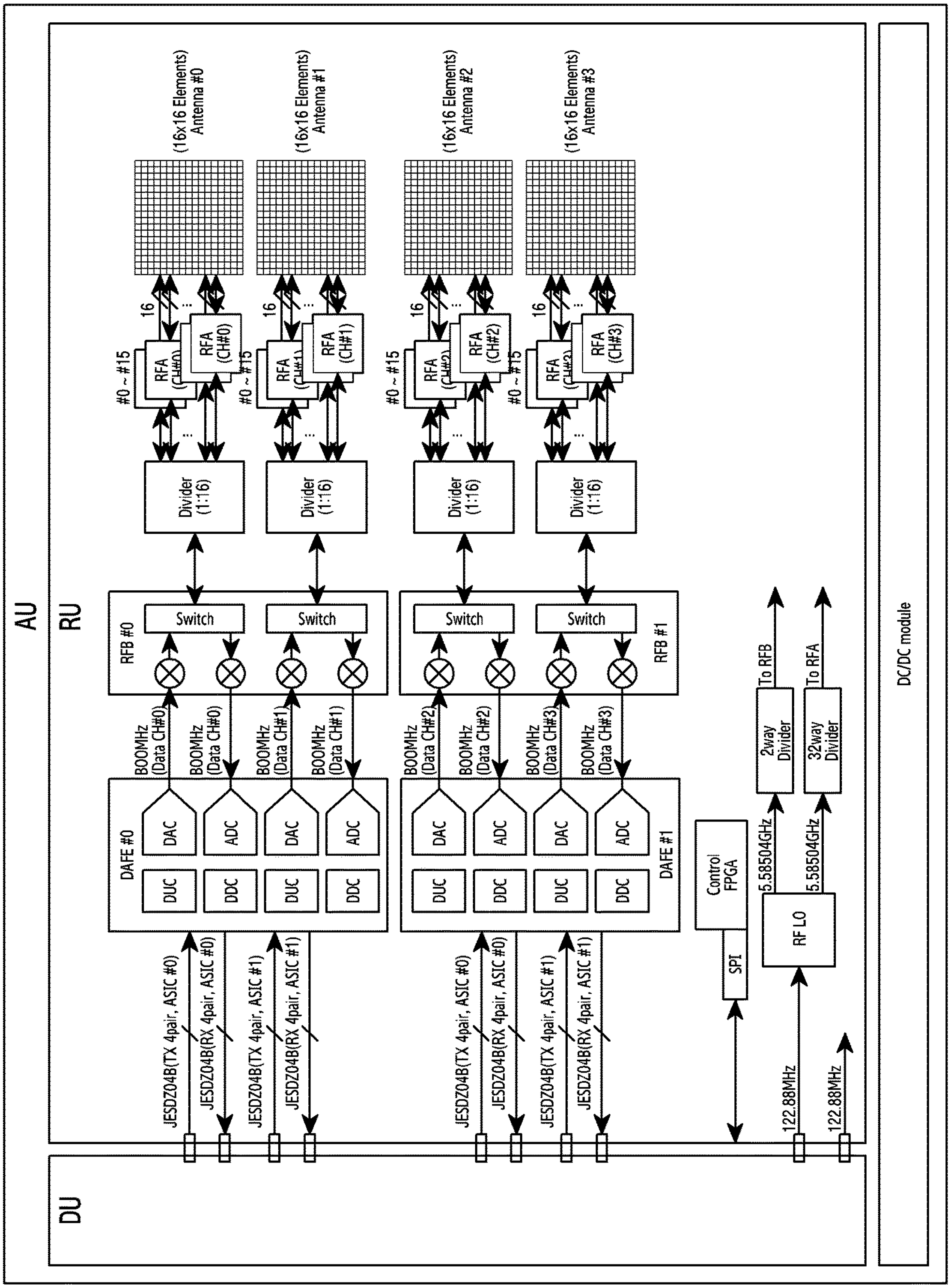
FIGS. 3A and 3B illustrate an example of functional configuration of an electronic device according to various embodiments of the disclosure.
Figure 3B:
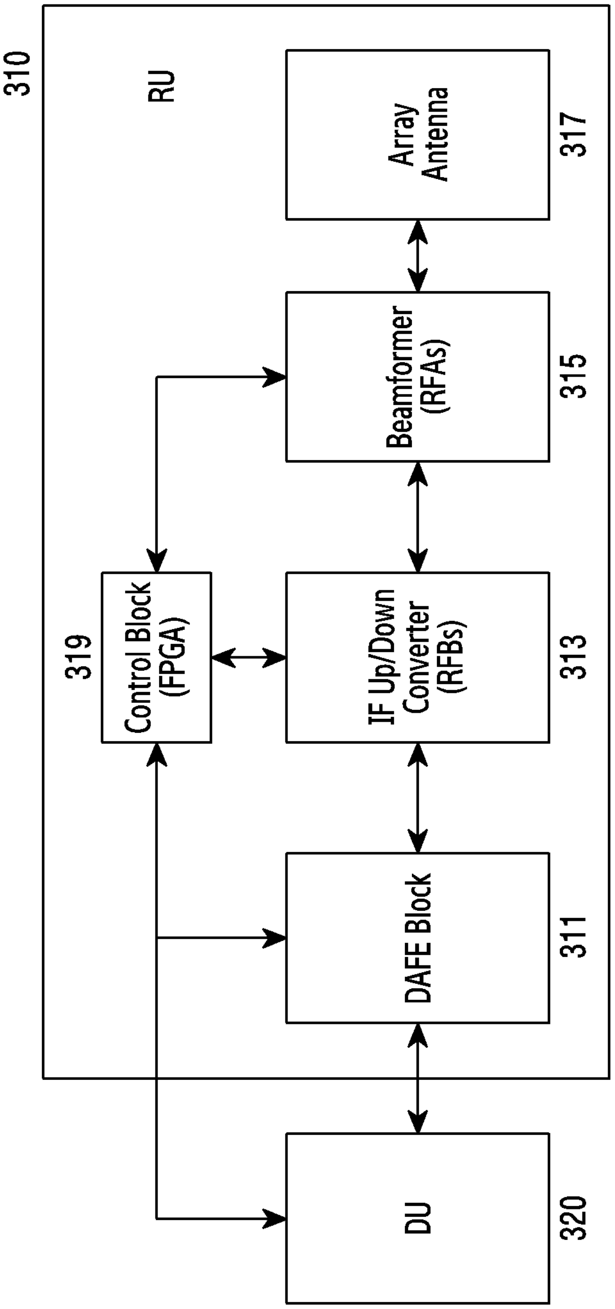

FIGS. 3A and 3B show an example of functional configuration of an electronic device according to various embodiments of the disclosure.

Referring to FIGS. 3A and 3B, the electronic device may include an access unit. The access unit may include an RU 310, a DU 320, and a direct current (DC)/DC module. The RU 310 according to embodiments of the disclosure may mean an assembly to which antennas and RF components are mounted. The DU 320 according to embodiments of the disclosure may be configured to process a digital wireless signal, and encrypt a digital wireless signal to be transmitted to the RU 310 or decrypt a digital wireless signal received from the RU 310. The DU 320 may be configured to perform communication with an upper node (e.g., a centralized unit (CU)) or a core net (e.g., 5G core (5GC) and evolved packed core (EPC)) by processing packet data.

Referring to FIG. 3A, the RU 310 may include multiple antenna elements. The RU 310 may include at least one array antenna. The array antenna may be formed of a planar antenna array. The array antenna may correspond to one stream. The array antenna may include multiple antenna elements corresponding to one transmission path (or reception path). By way of example, the array antenna may include 256 antenna elements having a 16×16 form.

The RU 310 may include RF chains for processing a signal of each array antenna. The RF chains may be referred to as "RFA". The RFA may include a mixer and RF components (e.g., a phase transformer and a power amplifier) for beamforming. The mixer of the RFA may be configured to down-convert an RF signal of an RF frequency into an intermediate frequency, or up-convert an intermediate frequency into a signal of an RF frequency. According to an embodiment of the disclosure, one set of RF chains may correspond to one array antenna. By way of example, the RU 310 may include four RF chain sets for four array antennas. Multiple RF chains may be connected to a transmission path or a reception path through a divider (e.g., 1:16). Although not shown in FIG. 3A, according to an embodiment of the disclosure, the RF chains may be implemented as a RF integrated circuit (RFIC). The RFIC may process and generate RF signals provided to multiple antenna elements.

The RU 310 may include a digital analog front end (DAFE) and "RFB." The DAFE may be configured to perform interconversion between a digital signal and an analog signal. By way of example, the RU 310 may include two DAFEs (DAFE #0 and DAFE #1). The DAFE may be configured to up-convert a digital signal (i.e., DUC) and convert the up-converted signal into an analog signal (i.e., DAC) in a transmission path. The DAFE may be configured to convert an analog signal into a digital signal (i.e., ADC) and down-convert a digital signal (i.e., DDC) in a reception path. The RFB may include a mixer and a switch corresponding to a transmission path and a reception path. The mixer of the RFB may be configured to up-convert a baseband frequency into an intermediate frequency, or down-convert a signal of an intermediate frequency into a signal of a baseband frequency. The switch may be configured to select one of a transmission path and a reception path. By way of example, the RU 310 may include two RFBs (RFB #0 and RFB #1).

The RU 310 as a controller may include a field programmable gate array (FPGA). The FPGA means a semiconductor including a designable logic element and a programmable internal circuit. Communication with the DU 320 may be performed through Serial Peripheral Interface (SPI) communication.

The RU 310 may include a local oscillator (RF LO). The RF LO may be configured to provide a reference frequency for up-conversion or down-conversion. According to an embodiment, the RF LO may be configured to provide a frequency for up-conversion or down-conversion of the RFB described above. For example, the RF LO may provide a reference frequency to RFB #0 and RFB #1 through a two-way divider.

The RF LO may be configured to provide a frequency for up-conversion or down-conversion of the RFA described above. For example, the RF LO may provide a reference frequency to each RFA (eight per RF chain for each polarization group) through a 32-way divider.

Referring to FIG. 3B, the RU 310 may include a DAFE block 311, an IF up/down converter 313, a beamformer 315, an array antenna 317, and a control block 319. The DAFE block 311 may convert a digital signal into an analog signal or an analog signal into a digital signal. The IF up/down converter 313 may correspond to the RFB. The IF up/down converter 313 may convert a signal of a baseband frequency into a signal of an IF frequency, or a signal of an IF frequency into a signal of a baseband frequency based on the reference frequency provided from the RF LO. The beamformer 315 may correspond to the RFA. The beamformer 315 may convert a signal of an RF frequency into a signal of an IF frequency, or a signal of an IF frequency into a signal of an RF frequency based on the reference frequency provided from the RF LO. The array antenna 317 may include multiple antenna elements. Each antenna element of the array antenna 317 may be configured to radiate a signal processed through the RFA. The array antenna 317 may be configured to perform beamforming according to a phase applied by the RFA. The control block 319 may control each block of the RU 310 to perform a command from the DU 320 and the signal processing described above.

Although the base station was described as an example of the electronic device in FIGS. 2A, 2B, 3A, and 3B, the embodiments of the disclosure are not limited to the base station. Embodiments of the disclosure may be applied to any electronic device for radiating a wireless signal in addition to a base station including a DU and an RU.

Figure 4:
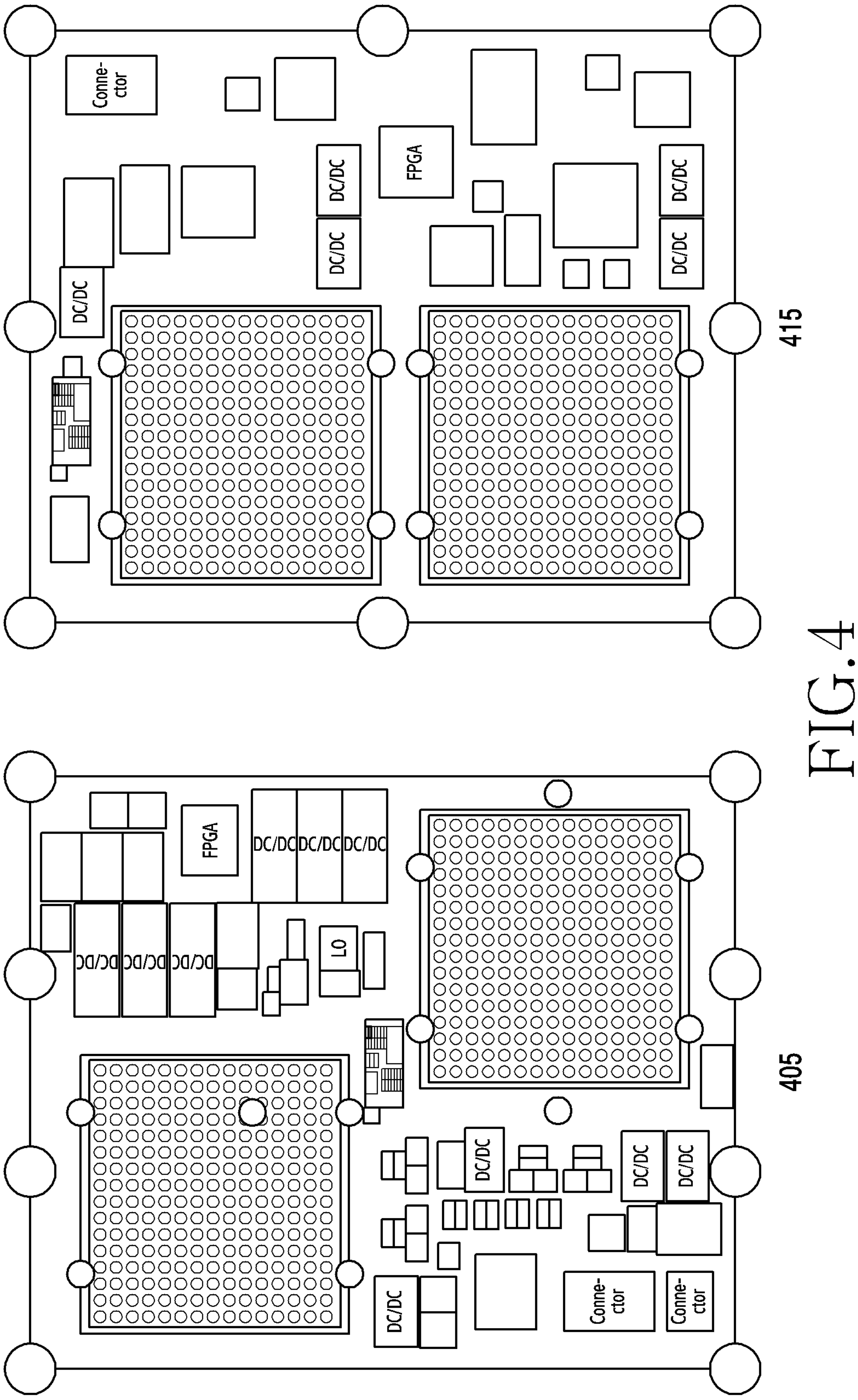
FIG. 4 illustrates an example of a radio unit (radio frequency (RF)) board of an electronic device according to an embodiment of the disclosure.

FIG. 4 shows an example of a radio unit (RU) board of an electronic device according to an embodiment of the disclosure.

Referring to FIG. 4, the electronic device amounts to a structure including a separate arrangement of a PCB (hereinafter, a first PCB) to which an antenna is mounted and a PCB (hereinafter, a second PCB) to which array antennas and components (e.g., a connector, a direct current (DC)/DC converter, and a DFE) for signal processing are mounted. The first PCB may be referred to as an antenna board, an antenna substrate, a radiation substrate, a radiation board, or an RF board. The second PCB may be referred to as an RU board, a main board, a power board, a mother board, a package board, or a filter board.

Referring to FIG. 4, the RU board may include components for transferring a signal to a radiator (e.g., an antenna). One or more antenna PCBs (i.e., the first PCBs) may be mounted on the RU board. One or more array antennas may be mounted on the RU board. By way of example, two array antennas may be mounted on the RU board. According to an embodiment of the disclosure, the array antennas may be arranged on symmetrical positions on the RU board (405). According to another embodiment, array antennas may be arranged on one side (e.g., a left side) of the RU board and RF components to be described below may be arranged on the other side (e.g., a right side) (415). Although two array antennas are shown in FIG. 4, embodiments of the disclosure are not limited thereto. Two array antennas may be arranged for each band so as to support a dual band, and the array antennas mounted on the RU board may be configured to support 2-transmit 2-receive (2T2R).

The RU board may include components for supplying an RF signal to an antenna. The RU board may include one or more DC/DC converters. The DC/DC converter may be used for converting a direct current into a direct current. The RU board may include one or more local oscillators (LO). The LO may be used for supplying a reference frequency for up-conversion or down-conversion in an RF system. The RU board may include one or more connectors. The connector may be used for transferring an electrical signal. The RU board may include one or more dividers. The divider may be used for distributing an input signal and transferring an input signal to multiple paths. The RU board may include one or more low-dropout regulators (LDOs). The LDO may be used for suppressing external noise and supplying power. The RU board may include one or more voltage regulator modules (VRMs). The VRM may mean a module for securing a proper voltage to be maintained. The RU board may include one or more digital front ends (DFEs). The RU board may include one or more radio frequency programmable gain amplifiers (FPGAs). The RU board may include one or more intermediate frequency (IF) processors. Some of the components shown in FIG. 4 may be omitted or more components may be additionally mounted as the configuration shown in FIG. 4. Although not described with reference to FIG. 4, the RU board may include an RF filter for filtering a signal.

Figure 5A:
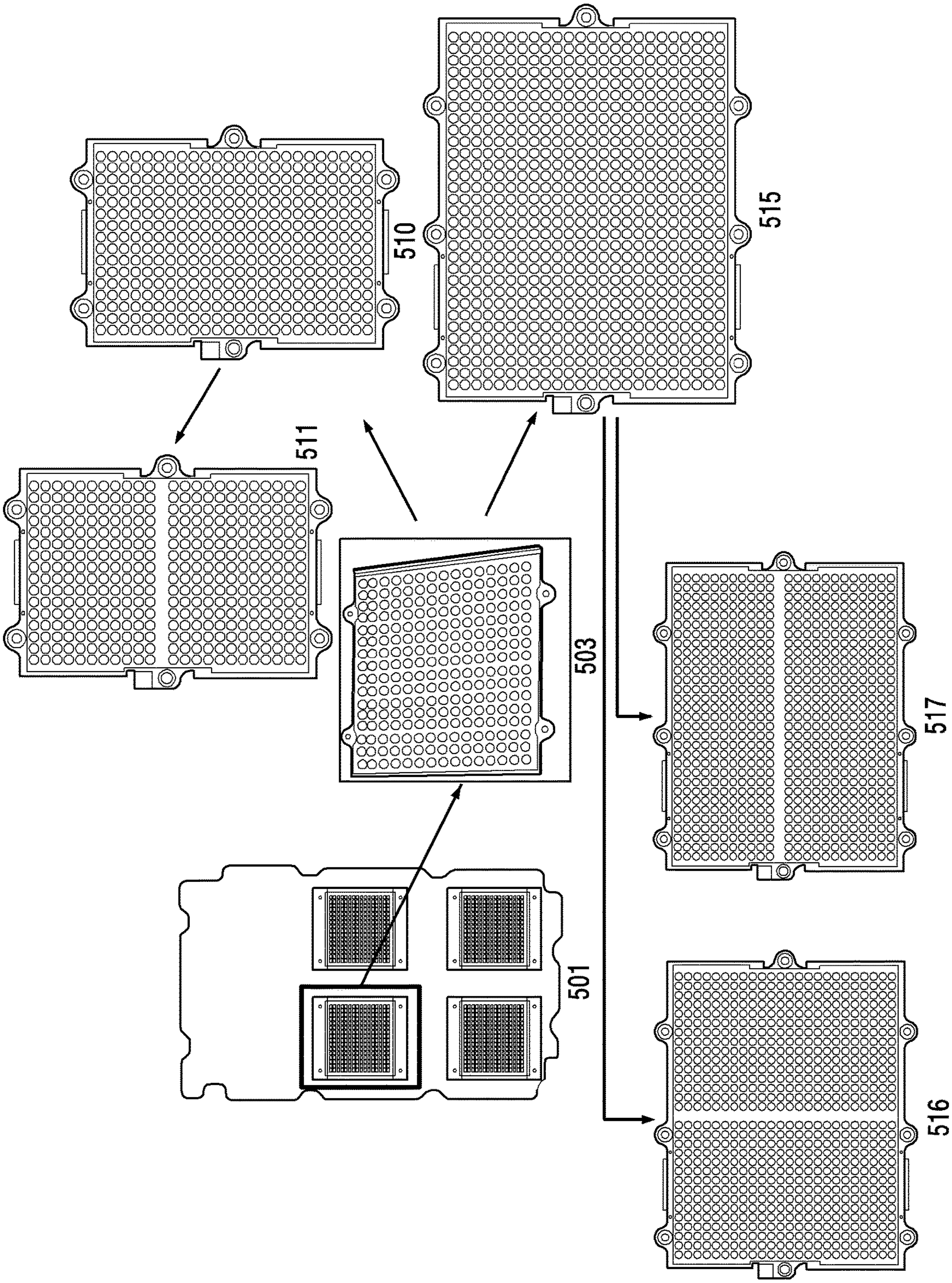
FIG. 5A illustrates an example of an RU module according to an embodiment of the disclosure.

FIG. 5A illustrates an example of an RU module according to an embodiment of the disclosure.

Referring to FIG. 5A, the RU module 501 may include one or more antenna arrays. For example, the RU module 501 may include 4 antenna arrays. One antenna array 503 may include multiple antenna elements. For example, one antenna array 503 may include 256 (=16×16) antenna elements.

As technology advances, while transmission output is improved, equivalent reception performance needs to be secured and supporting a dual band is also required. Such requirements cause an increase in volume compared to a size of an existing equipment. In addition, the number of antenna elements for each path increases for equivalent performance or higher performance. For example, instead of a base station which supports 4T4R in an existing single band (e.g., 28 GHz band or 39 GHZ band), when supporting 2T2R in a dual band, the number of antenna elements for each path may be increased from 256 to 384. Furthermore, in an equipment for a dual band, an interval between antenna is increased and the entire area for each path is increased.

As shown in FIG. 5A, the number of antenna elements in a single antenna array may be increased for the purpose of improving performance. For example, the antenna array 510 may include 384 (=24×16) antenna elements. As another example, the antenna array 515 may include 768 (=32×24) antenna elements. The increase in the size of the antenna array causes an increase in the difficulty of assembling an RU module. Particularly, the alignment is a sensitive matter in an ultra-high band (e.g., an mmWave band), and thus implementation of an integrated antenna is required for reducing assembly error and maximizing high degree of alignment.

Although, a single large antenna array is illustrated, embodiments of the disclosure are not limited thereto. According to an embodiment of the disclosure, multiple sub arrays may be operated in one antenna array. For example, the antenna array 511 may be used instead of the antenna array 510. The antenna array 511 may include a sub array on an upper side and a sub array on a lower side. As another example, the antenna array 516 or the antenna array 517 may be used instead of the antenna array 515. The antenna array 516 may include a sub array on a left side and a sub array on a right side. The antenna array 517 may include a sub array on an upper side and a sub array on a lower side.

Figure 5B:
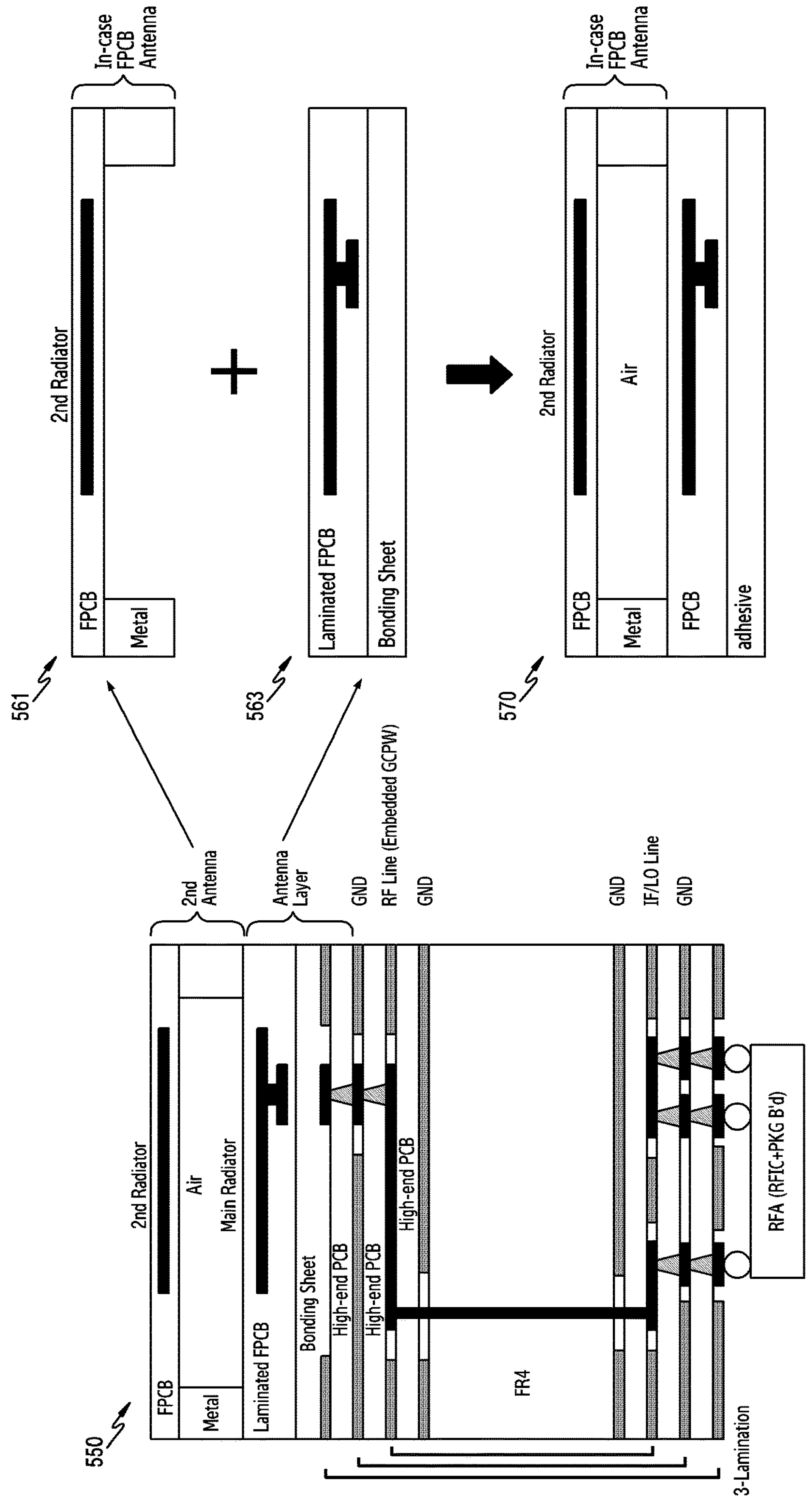
FIG. 5B illustrates an example of a stacking structure of an RU module according to an embodiment of the disclosure.

FIG. 5B illustrates an example of a stacking structure of an RU module according to an embodiment of the disclosure. The stacking structure shown in FIG. 5B is merely an example for explaining a stacking structure of the adhesive-based antenna assembly according to embodiments of the disclosure and embodiments of the disclosure are not limited thereto.

Referring to FIG. 5*b*, the antenna assembly means a combination of radiators, substrates, and adhesive layers corresponding to an antenna array in an RU module. In the disclosure, the antenna assembly may be referred to as other terms having an equivalent technical meaning, such as an antenna unit, a radiation unit, and a radiator unit.

Referring to FIG. 5B, the electronic device may include an RU module 550. The RU module 550 may include an antenna assembly 570 having a dual antenna structure. The antenna assembly 570 may include a first antenna part and a second antenna part 561. The first antenna part may include a main radiator. The main radiator may mean a radiator disposed adjacent to a main board. The second antenna part 561 may include an additional radiator (hereinafter, a second radiator) formed on a cover. The second antenna part 561 may include a metal pillar for supporting the cover. The metal pillar shown in the stacking structure may correspond to most portion of a metal plate excluding a hole. The antenna shown in FIG. 5B is merely an embodiment and is not construed to delimit other embodiments of the disclosure. The radiator corresponds to an antenna element of the antenna array.

The main radiator may be disposed on an antenna board 563 (e.g., the first PCB in FIG. 4). The antenna board is a PCB (or a FPCB) to which the antenna elements are mounted and which is distinguished from a FPCB of the second antenna part disposed on the metal plate. Unlike the cross-sectional view shown in FIG. 5B, not only one antenna element (e.g., the main radiator) but also multiple antenna elements may be mounted on the first layer of the antenna board 563 according to embodiments of the disclosure. The group of the multiple antenna elements may be an antenna array.

The first antenna part may be attached to the PCB. An adhesive material may be disposed on a lower surface of the first antenna part. The first antenna part may be attached to the PCB through the adhesive material. The PCB may mean a main board of the PCB. The PCB may include multiple substrates. Multiple substrates may be stacked in the PCB. The PCB may include a feeding layer. The feeding layer may include an RF line. For example, the RF line may include embedded grounded co-planar waveguide (GCPW). The PCB may include one or more ground layers. A via hole may be formed through layers of the PCB. For example, the PCB may include a via hole formed by a laser process and a via hole formed by a PTH process. According to an embodiment, the PCB may include a low-cost layer formed of FR4 for a coaxial PTH.

As described above, the antenna assembly has a dual antenna structure. The dual antenna structure may mean a structure in which a radiator (e.g., an antenna) is disposed on a substrate and an additional radiator is formed on another different substrate. An air layer may be disposed on the radiator and the additional radiator may be disposed on the air layer. The radiator and the additional radiator may be disposed on different layers with reference to the air layer. An air cavity is formed through the air layer. According to an embodiment of the disclosure, the air layer may be formed through a hole of the metal plate.

For the dual antenna structure, bonding between the main radiator (hereinafter, a first antenna) and the additional radiator (hereinafter, a second antenna) is required. For example, the main radiator may be implemented on a laminated FPCB. The laminated FPCB may be bonded to the main board through an adhesive such as a bonding sheet. The second radiator may be implemented on a FPCB. An assembly of the FPCB and the metal pillar may be bonded to the laminated FPCB bonded to the main board. However, such an assembling method may cause a high fabrication error as a size of antenna arrays increases due to two-step assembly. The increase in size of a shape of antennas that have been respectively assembled may cause increase in cost and a disadvantageous problem in mass production.

To solve the problems described above, embodiments of the disclosure propose a method in which a first radiator and a second radiator are bonded to each other first and the bonded radiator module is attached to a main board other than a method in which a first radiator and a second radiator are sequentially assembled to a main board, an antenna assembly generated by the method, and an RU module including same. The use of an adhesive material instead of a lamination method may simplify assembly and improve performance.

Figure 6:
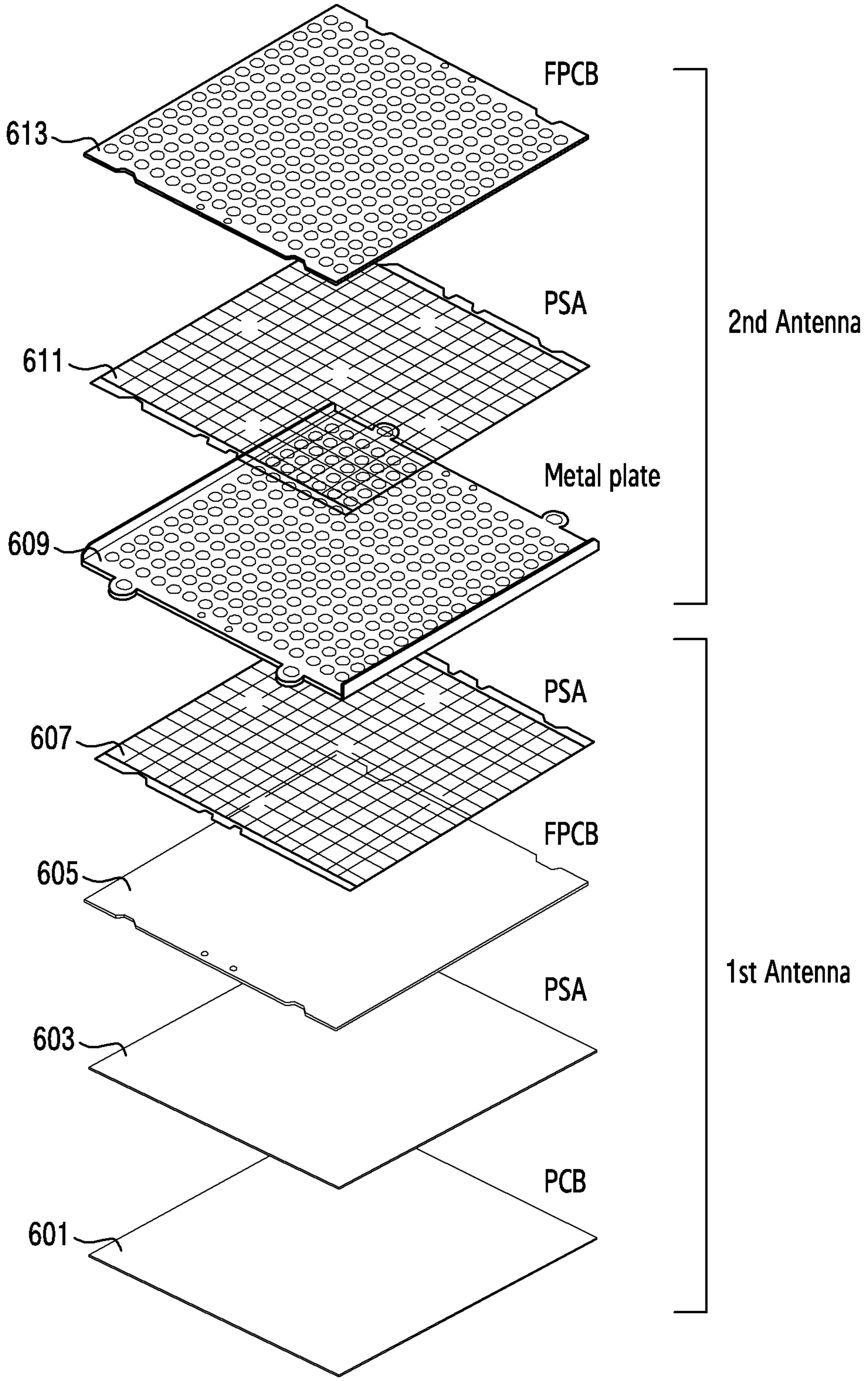
FIG. 6 illustrates an example of a stacking structure of an adhesive-based antenna assembly according to an embodiment of the disclosure.

FIG. 6 illustrates an example of a stacking structure of an adhesive-based antenna assembly according to an embodiment of the disclosure.

Referring to FIG. 6, the antenna assembly includes a dual antenna structure. The dual antenna structure is a structure in which a main radiator and an additional radiator are bonded to each other and means multi-layer arrangement of antennas for enhancing radiation performance by positioning an additional radiator in a radiation direction of a main radiator.

Referring to FIG. 6, the antenna assembly may be bonded to a PCB 601. The PCB 601 may mean a board to which the antenna assembly bonded. The adhesive-based assembly means, as described above, an integrated assembly in which a first antenna part and the second antenna part having a dual antenna structure are bonded to each other through an adhesive (or adhesive material). The antenna assembly may be referred to as an antenna unit. The antenna assembly may correspond to one antenna array of all antennas (e.g., the antenna array 503 in FIG. 5A). Although not shown in FIG. 6, the PCB 601 may include multiple antenna assemblies.

The PCB 601 may be referred to as an RU board, a main board, a power board, a mother board, a package board, or a filter board.

The antenna assembly has a dual antenna structure. The dual antenna structure may consist of a first antenna part including a main radiator and a second antenna part including an additional radiator. The main radiator of the first antenna part may be bonded to a PCB of a main board to perform a function of radiating a signal. The second antenna part may be stacked substantially parallel with a radiation surface of the main radiator. The additional radiator of the second antenna part may relay or amplify a signal of the main radiator. The first antenna part may include a first pressure sensitive adhesive (PSA) 603, a first FPCB 605, and a second PSA 607. The second antenna part may include a metal plate 609, a third PSA 611, and a second FPCB 613.

The first antenna part may include a structure in which the first PSA 603, the first FPCB 605, and the second PSA 607 are sequentially stacked. The first PSA 603 is an adhesive material for bonding a board of the main radiator, that is, the antenna board to the PCB 601. The second PSA 607 is an adhesive material for bonding the metal plate 609 and the first FPCB 605. The PSA as a pressure-sensitive adhesive is an adhesive in which an adhesive material is activated when pressure is applied to bond the adhesive to the adhesive surface. The adhesion strength is affected by an amount of pressure for allowing an adhesive to be applied to a surface. Although the pressure-sensitive adhesive (PSA) for low temperature pressure or roll pressure is exemplified as an adhesive material in the disclosure, a drawing or specific description does not delimit embodiments of the disclosure. The PSA may be manufactured to maintain appropriate adhesion and persistency at room temperature in general. According to various embodiments, there are adhesives manufactured to normally operate at low temperature or high temperature (e.g., a thermosetting bonding sheet).

The first FPCB 605 may be a substrate (or antenna board) on which the main radiator is mounted. Although the FPCB is exemplified as a board to which a radiator is mounted, it is to be understood that a PCB or another substrate other than the FPCB may be used.

The second antenna part may include a structure in which the metal plate 609, the third PSA 611, and a second FPCB 613 are sequentially stacked. The metal plate 609 may provide a metal pillar for forming an air layer between the main radiator of the first FPCB 605 and the additional radiator of the second PCB 613. The number of holes of the metal plate 609 may correspond to the number of radiation elements of the first FPCB 605. The number of holes of the metal plate 609 may correspond to the number of radiation elements of the second FPCB 613. That is, the number of holes of the metal plate 609 may correspond to the number of antenna elements of the antenna array.

The third PSA 611 is an adhesive material for bonding the metal plate 609 and the second FPCB 613. The description of the first PSA 603 and the second PSA 607 may be applied to the third PSA 611 in an identically or similarly manner.

The second FPCB 613 may be a substrate (or antenna board) on which the additional radiator is mounted. Although the FPCB is exemplified as a board to which a radiator is mounted, it is to be understood that a PCB or another substrate other than the FPCB may be used.

The adhesive-based antenna assembly according to embodiments of the disclosure may include a hole structure for each of multiple antenna elements of the antenna array. The metal plate 609 may include a hole for each of the multiple antenna elements of the antenna array, that is, each radiator. The second PSA 607 may include a hole for each of the multiple antenna elements of the antenna array (i.e., a radiator of the first antenna part). The third PSA 611 may include a hole for each of the multiple antenna elements of the antenna array, that is, a radiator of the second antenna part. A shape of the hole formed through a plate may be a circle, a polygon, or any other shape. An area of a hole region may be larger than an area of the radiator surface.

Figure 7:
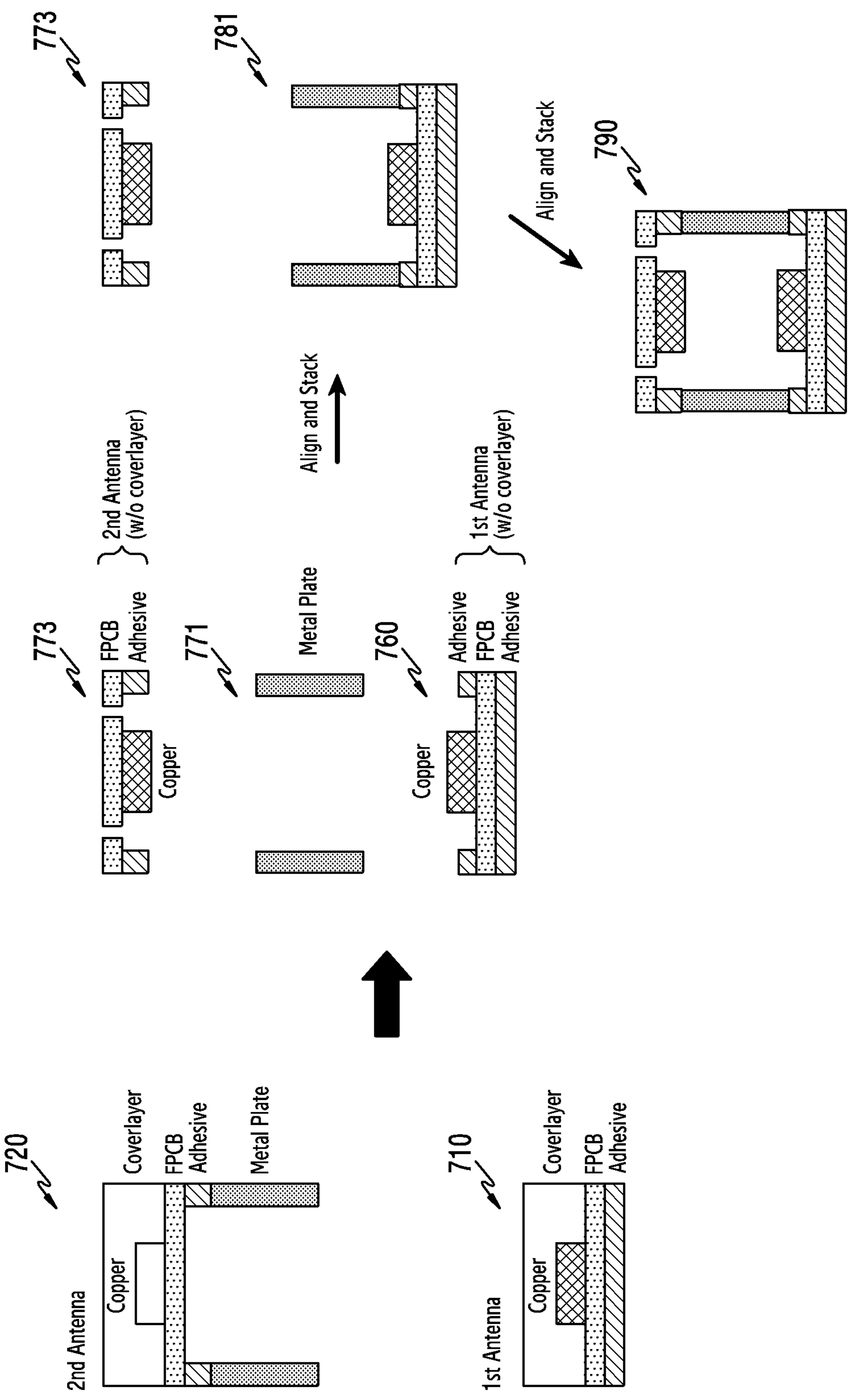
FIG. 7 illustrates an example of assembling of an adhesive-based antenna assembly according to an embodiment of the disclosure.

FIG. 7 illustrates an example of assembly of an adhesive-based antenna assembly according to an embodiment of the disclosure.

Referring to FIG. 7, the adhesive-based assembly means, as described above, an assembly in which a first antenna part and the second antenna part having a dual antenna structure are bonded to each other through an adhesive (or adhesive material).

Referring to FIG. 7, a first structure 710 means the first antenna part of the dual antenna structure of an existing antenna structure. The first structure 710 may include a structure in which an adhesive, a FPCB, and a radiator (e.g., copper) are sequentially stacked. To prevent corrosion, a cover layer may be formed through coating around the radiator. A second structure 720 means the second antenna part of the dual antenna structure of an existing antenna structure. The second structure 720 may include a structure in which a metal plate, an adhesive, and a radiator (e.g., copper) are sequentially stacked. Similar to the first structure 720, to prevent corrosion, a cover layer may be formed through coating around the radiator. A metal pillar of the second structure 720 may be bonded to the FPCB of the first structure 710.

A method of sequentially bonding the first structure 710 and the second structure 720 may easily cause a fabrication error in actual assembling due to bonding through two bonging methods when multiple elements are included. As the number of antenna elements increases, the area of a substrate layer increases. This is because the area of the large substrate layer may cause high tolerances during assembly.

A method will be assumed that after the first structure 710 and the second structure 720 are bonded, the bonded structure is bonded to a PCB (i.e., main board). When the first structure 710 and the second structure 720 are bonded (hereinafter, a first bonding), the metal pillar is directly bonded to the FPCB, thus still causing a tolerance (e.g., a height difference and interval difference for each radiator). An antenna operation in an mmWave band may be more sensitive to this tolerance. Thereafter, due to the bonding (hereinafter, a second bonding) between the bonded structure and the PCB, additional distortion may be caused or a degree of the tolerance having occurred in the first bonding increases. To solve the above-mentioned problems, the disclosure proposes an antenna structure including an adhesive material disposed between the FPCB of the first antenna part and the metal layer of the second antenna part.

The first structure 760 may include a structure in which an adhesive, a FPCB, and a radiator (e.g., copper) are sequentially stacked. In a radiation layer, an adhesive layer may be disposed on a portion other than an area in which the radiator is disposed. In other words, the adhesive layer may include a hole, and the radiator may be disposed on a corresponding hole. A metal pillar 771 means a metal plate. The metal plate may include a hole corresponding to the radiator, and a portion excluding the hole may function as a pillar in a stacking structure. Due to the disposition of the adhesive and the metal pillar 771, the radiator may not need a separate cover layer. That is, unlike the first structure 710, the first structure 760 may not include a cover layer.

The second structure 773 may include a structure in which an adhesive, and a FPCB are sequentially stacked. Unlike the second structure 720, the radiator (e.g., copper) may be disposed inside the metal pillar, that is, disposed facing downward. The adhesive layer may include a hole, and the radiator may be disposed on a corresponding hole. Due to the disposition of the adhesive and the metal pillar 771, the radiator may not need a separate cover layer. That is, unlike the first structure 710, the first structure 760 may not include a cover layer.

The first structure 760, the metal pillar 771, and the second structure 773 may be aligned. According to an embodiment, the first structure 760 and the second structure 773 may be aligned such that a first radiation surface and a second radiation surface are substantially parallel with each other. The first structure 760, the metal pillar 771, and the second structure 773 may be aligned such that the first radiation surface and the second radiation surface are located inside a hole of the metal plate. It is because the metal pillar 771 formed by the hole of the metal plate needs to ensure isolation while not obstructing a signal path of the radiator. The metal pillar 771 may be bonded to the first structure 760. The second structure 773 may be stacked on a structure 781 in which the first structure 760 and the metal pillar 771 are bonded to each other. An antenna assembly 790 may be formed through the above-described alignment and stacking (or bonding).

The bonding order shown in FIG. 7 is merely one example and is not construed to delimit embodiments of the disclosure. It is to be understood that the second structure 773 may be bonded on the metal pillar 771, and the bonded structure may be stacked on the first structure 760.

Copper is exemplified as a metal for a material of the radiator in FIG. 7. However, embodiments of the disclosure are not limited thereto. According to another embodiment of the disclosure, nickel (Ni) or tin (Sn) may be additionally used for plating.

Figure 8:
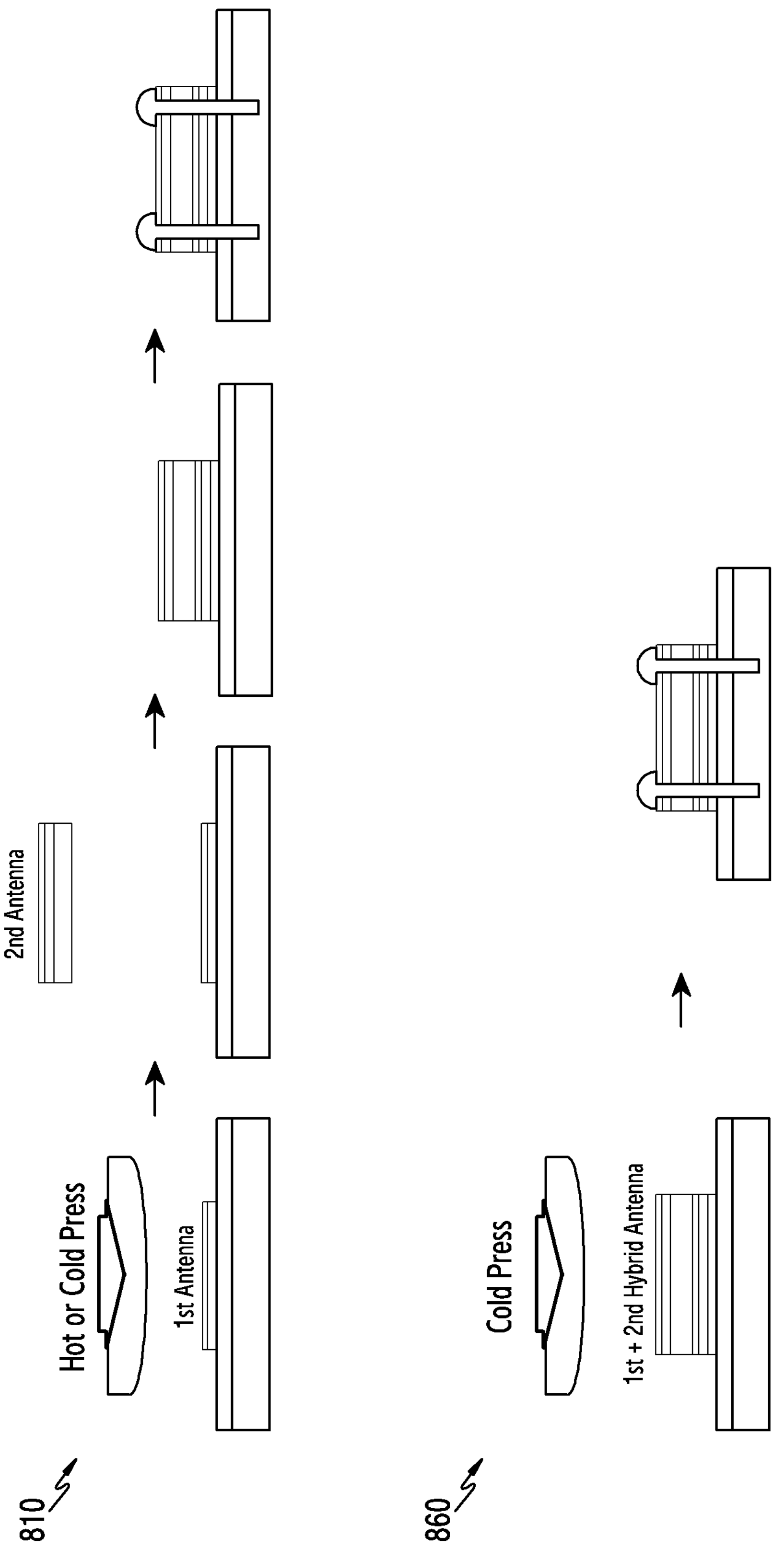
FIG. 8 illustrates an example of a process of an adhesive-based antenna assembly according to an embodiment of the disclosure.

FIG. 8 illustrates an example of a process of an adhesive-based antenna assembly according to an embodiment of the disclosure.

Referring to FIG. 8, a first process 810 shows a stacking process of a dual structure antenna of an RU module. A first antenna part corresponds to the first structure 710 in FIG. 7. A second antenna part corresponds to the second structure 720 in FIG. 7. The first antenna part (i.e., a FPCB to which an antenna is disposed or laminated FPCB) is stacked on a PCB (i.e., a main board), and the stacked assembly is pressurized. According to an embodiment of the disclosure, low-temperature compression may be performed. An adhesive material of an antenna assembly may be a PSA. According to an embodiment of the disclosure, high-temperature, high-pressure compression may be performed. An adhesive material of an antenna assembly may be a thermosetting adhesive material. Thereafter, the second antenna part is bonded to the assembly. Bolt-assembly may be used for fixation of the second antenna part. One or more bolts may be disposed to penetrate the second antenna part, the first antenna part, and at least one layer of the PCB.

A second process 860 shows a stacking process of an adhesive-based antenna assembly according to embodiments of the disclosure.

The adhesive-based antenna assembly may be disposed on the PCB, and the adhesive-based antenna assembly may be pressurized. The pressure may be applied in a direction perpendicular to a surface of the PCB for solid bond between the first antenna part and the second antenna part and solid bond between the antenna assembly and the PCB. According to an embodiment, low-temperature compression may be performed. An adhesive material of an antenna assembly may be a PSA. According to an additional embodiment, one or more bolts may be disposed to penetrate the antenna assembly and at least one layer of the PCB.

The antenna assembly may be an assembly in which different materials such as a metal and an adhesive material are bonded. The antenna assembly may include structures bonded to each other with an adhesive and may be bonded to the PCB (i.e., a main board) in one assembly through a single compression process.

Figure 9:
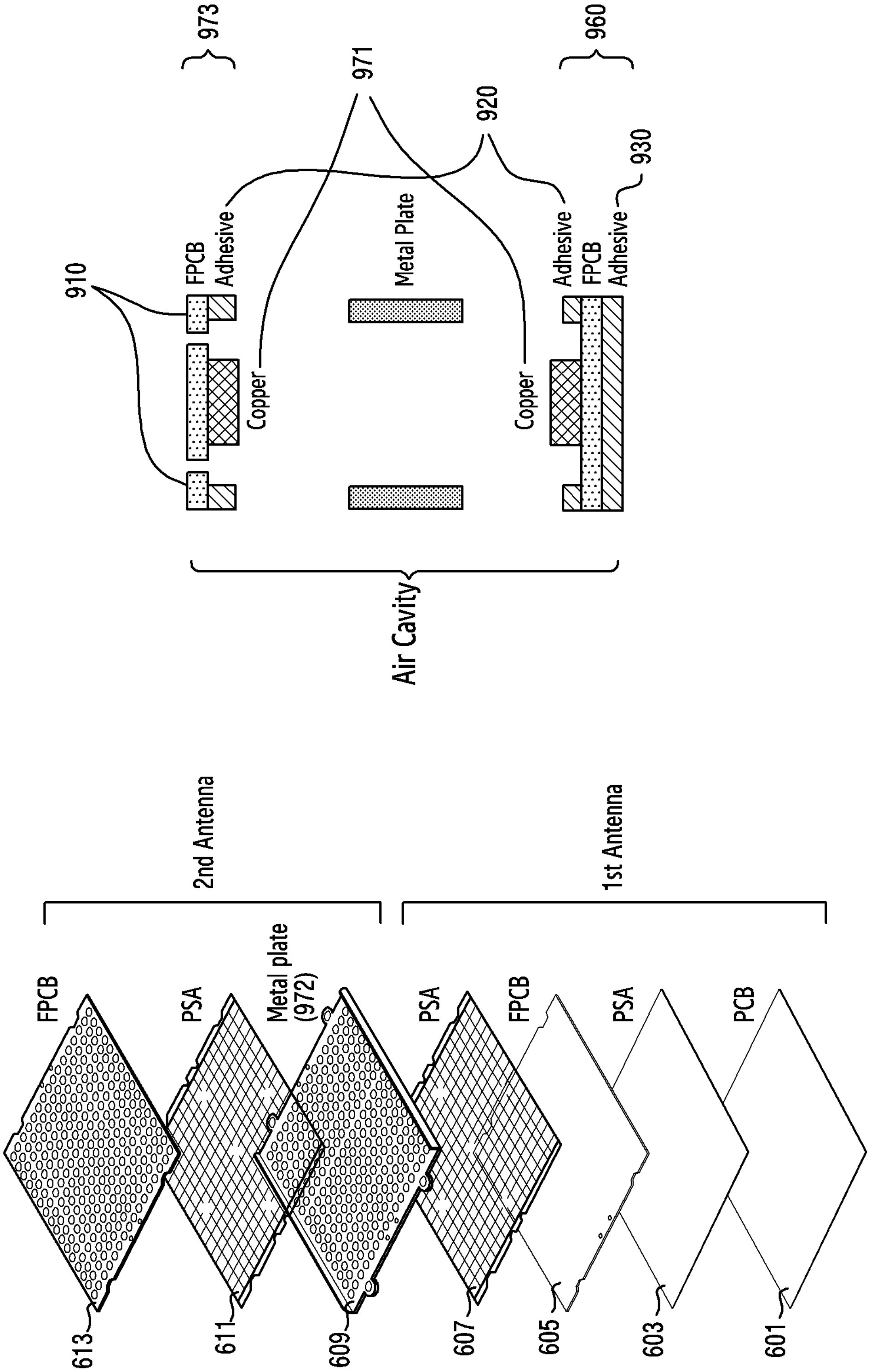
FIG. 9 is a diagram illustrating a technical principle of an adhesive-based antenna assembly according to an embodiment of the disclosure.

FIG. 9 is a diagram illustrating a technical principle of an adhesive-based antenna assembly according to an embodiment of the disclosure.

Referring to FIG. 9, the adhesive-based antenna assembly includes a dual antenna structure. The dual antenna structure may emit a signal with low dielectric loss by forming an air cavity between a main radiator of a first antenna part 960 and an additional radiator of a second antenna part 973. For example, the electronic device may be required to be constantly operated. By way of example, a base station may be constantly in ON state. Here, air is isolated due to an enclosed space of a metal layer, and compression and expansion of the isolated air may cause radiation performance degradation of an antenna. To reduce quality fluctuation, the antenna assembly according to embodiments of the disclosure may include a hole 910 through a substrate of the second antenna part 973. The FPCB on which the additional radiator is disposed, that is, the FPCB of the second antenna part 973 may include the hole 910 formed therethrough. The FPCB may correspond to the FPCB 613 in FIG. 6. The hole 910 may be an air vent hole for discharging air. Air trap (a phenomenon in which air collects within a designated area) may be prevented through the hole 910.

A metal plate may be required to have holes formed therethrough for each antenna element, that is, as many as the number of antenna elements for allowing a signal of a radiator to penetrate. A method for manufacturing the metal plate may employ punching or etching, stacking PCBs, or plating. The actually formed holes may not match each other in height and area. For example, if areas of holes corresponding to antenna elements are different or heights of the metal pillars are different, isolation performance difference occurs, causing interference. In addition, for example, radiation performance difference may occur between the first antenna part 960 and the second antenna part due to the height difference of the metal pillars. To minimize the performance difference, the antenna assembly according to embodiments of the disclosure may include an adhesive material 920.

Figure 13:
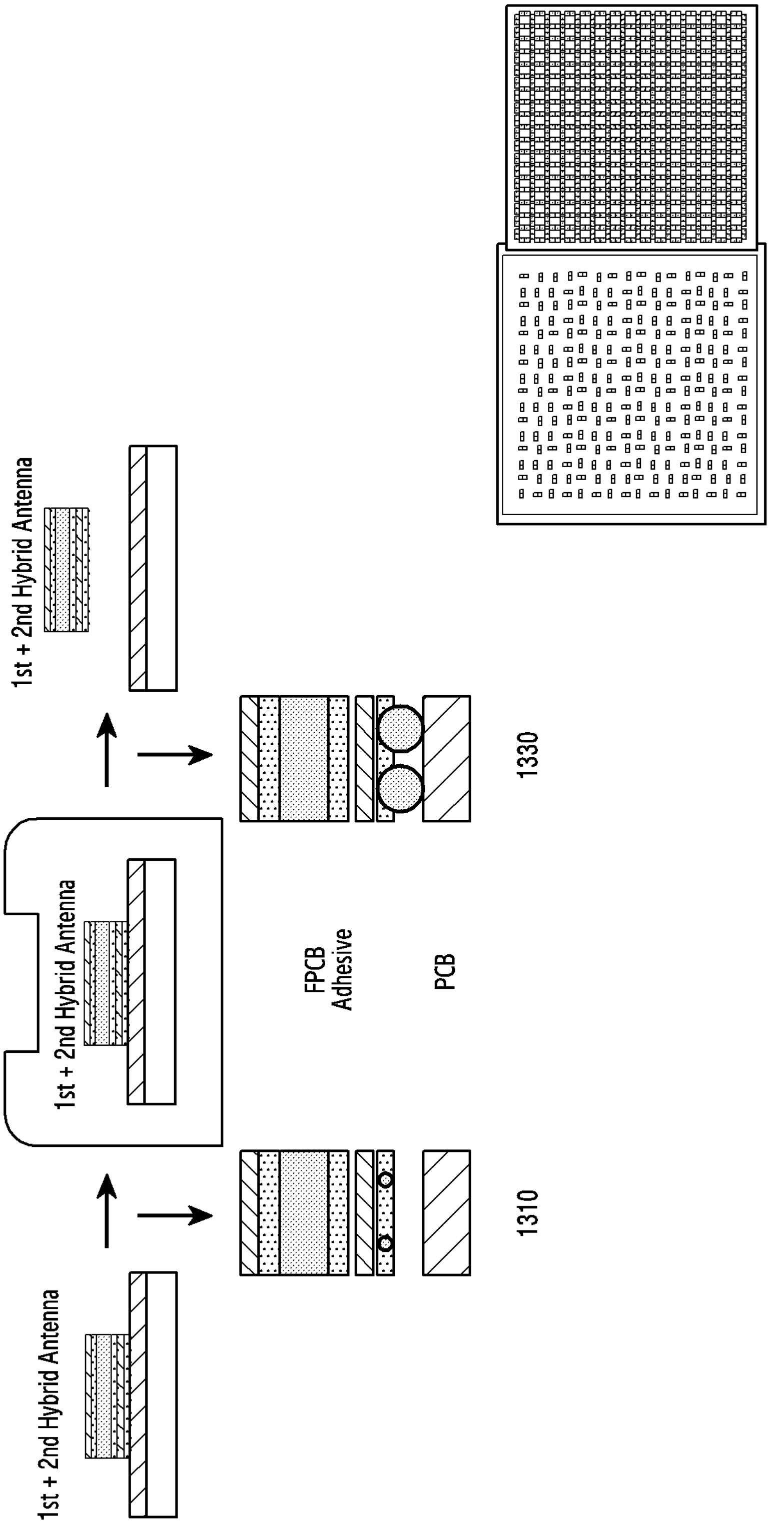
FIG. 13 illustrates an example of separation of an adhesive-based antenna assembly according to an embodiment of the disclosure.

The adhesive material 920 is disposed around a radiator to perform a function of facilitating bonding between the metal pillar and each FPCB. In the adhesive-based antenna assembly according to embodiments of the disclosure, the adhesive material 920 (e.g., the second PSA 706 and the third PSA 611 in FIG. 6) is disposed between bonding of the FPCB and the metal pillars. The adhesive material 920 functions to facilitate responding to flatness changes. In addition, the adhesive material 920 functions to compensate an assembly tolerance during bonding so as to maintain uniform spacing between antenna arrays. In addition, the adhesive material 930 may be disposed to facilitate bonding between the PCB and the antenna assembly. According to additional embodiment, as shown in FIG. 13 to be described below, the adhesive material may be disposed for rework, that is, detachment and re-attachment after the bonding between the PCB and the antenna assembly. The adhesive material may include a material configured to foam at a predetermined temperature for rework.

A radiator 971 is a component for radiating a signal. Although copper is exemplified as the radiator 971 in FIG. 9, it is to be understood that other materials other than copper may be used as an element for feeding in embodiments of the disclosure. According to an embodiment, the radiator 971 may not include a cover layer. Due to the removal of the cover layer, the radiator may be located in a hole surrounded by the metal pillars 972, which is a hole area of the metal plate 972. The antenna assembly includes an antenna radiator 971 disposed on a lower surface of the FPCB of the second antenna part 973, instead of an antenna radiator that is conventionally positioned upward. As the cover layer for preventing corrosion is not included, size reduction of an antenna assembly may be achieved. Instead of the cover layer, the metal pillars for bonding the first antenna part 960 and the second antenna part 973 perform isolation and shielding functions. In addition to size reduction, radiation performance may be also improved by positioning radiators in each hole of the metal plate.

According to an embodiment of the disclosure, the adhesive material 920 may be disposed such that a height of the adhesive material 920 is lower than a height of the radiator 971 with reference to the FPCB of the first antenna part 960. The adhesive material 920 may be disposed such that a height of the adhesive material 920 is lower than a height of the radiator 971 with reference to the FPCB of the second antenna part 973. To maximize the shielding effect by the metal pillars, the adhesive material 920 may be configured to have a thickness thinner than a thickness of the radiator 971. By way of example, the thickness of the adhesive material 920 may be about 45 μm-50 μm, and may be reduced due to pressure during antenna assembly assembling. The thickness of the radiator may be 50 μm.

Copper is exemplified as a metal for a material of the radiator in FIG. 9. However, embodiments of the disclosure are not limited thereto. According to another embodiment, nickel (Ni) or tin (Sn) may be additionally used for plating.

Figure 10:
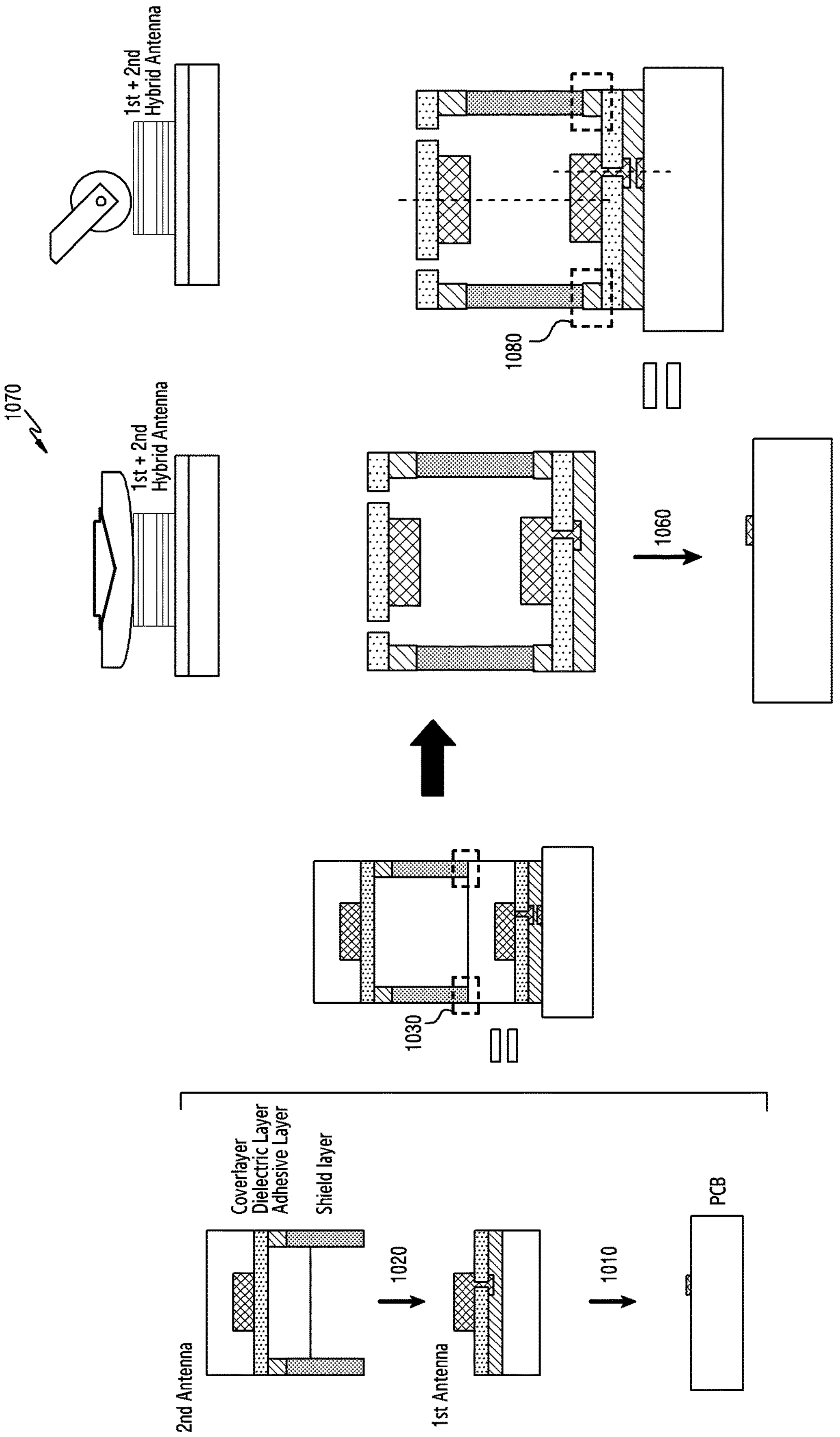
FIG. 10 is a diagram illustrating a principle of an adhesive-based antenna assembly according to an embodiment of the disclosure.

FIG. 10 is a diagram illustrating an isolation principle of an adhesive-based antenna assembly according to an embodiment of the disclosure. The isolation means a degree to which two signals are independently separated. The lower the isolation performance, the greater the interference.

Referring to FIG. 10, in bonding 1010, a first antenna part is stacked on a main PCB. In bonding 1020, a second antenna part is stacked on the first antenna part. This conventional bonding method may not eliminate an error formed during manufacturing a hole of a metal plate because the metal plate is directly bonded to a FPCB. A gap 1030 caused by height difference of the metal plate around one radiator may cause isolation performance degradation and thus cause a degradation in antenna performance.

To solve the above-described problem, the antenna assembly according to embodiments of the disclosure may include an adhesive layer. The adhesive layer may correspond to the second PSA 607 in FIG. 6. The adhesive layer may reduce an effect caused by a difference during bonding between the first antenna part and the second antenna part.

In bonding 1060, an adhesive-based antenna assembly is stacked on the main PCB. Thereafter, pressure 1070 is applied to the antenna assembly and the main PCB. A low-temperature compression (e.g., cold press) or roll press process may be used together with a vision align automatically recognizing a fiducial mark for assembly. As the first antenna part and the second antenna part are already bonded and the adhesive layer is located between the metal plate and the FPCB, even before or after the main PCB is assembled, performance degradation due to the gap 1080 is lower than performance degradation due to the gap 1030. According to an embodiment of the disclosure, the adhesive layer may be conductive. According to another embodiment, the adhesive layer may be non-conductive. A characteristic of the adhesive layer may vary according to a feeding structure of an antenna implemented in the FPCB.

Figure 11:
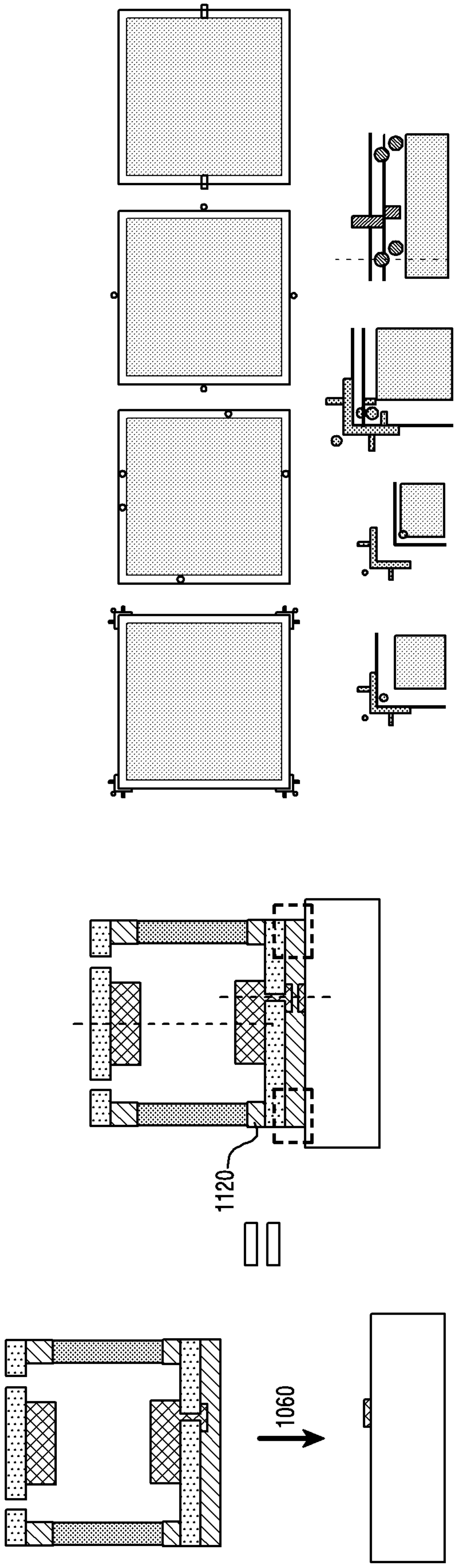
FIG. 11 illustrates an example of alignment of an adhesive-based antenna assembly according to an embodiment of the disclosure.

FIG. 11 illustrates an example of alignment of an adhesive-based antenna assembly according to an embodiment of the disclosure.

Referring to FIG. 11, in bonding 1060, an adhesive-based antenna assembly is stacked on a main PCB. Alignment 1120 is an important factor in this stacking. According to an embodiment, a FPCB and a PCB (i.e., a main board) of the adhesive-based antenna assembly may be coupled through an adhesive material. Here, after coupling, precise alignment 1120 may be required to prevent deterioration of feeding performance. The alignment may mean that the antenna assembly is located within a designated area of a surface of the PCB when viewing the surface of the PCB from above. An example of evaluation of the alignment 1120 may include pass or fail. In case that a distance between a first fiducial mark of the antenna assembly and a second fiducial mark of the PCB is less than a predetermined threshold value (1151), an RU module having the antenna assembly bonded thereto may pass the alignment evaluation (good-quality product). However, in case that a distance between the first fiducial mark of the antenna assembly and the second fiducial mark of the PCB is equal to or larger than a predetermined threshold value (1152) or the first fiducial mark are not aligned to each other (1153, 1154), the RU module having the antenna assembly bonded thereto may not pass the alignment evaluation.

Figure 12:
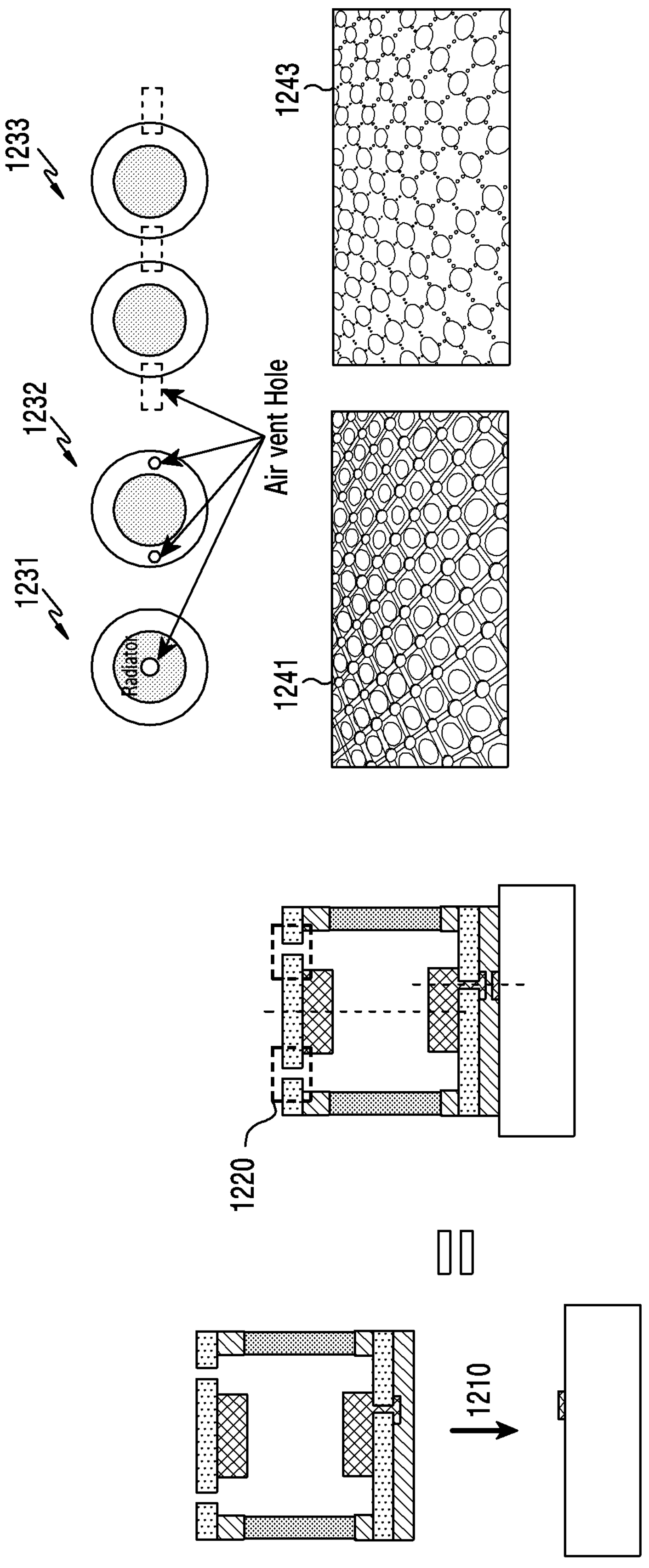
FIG. 12 illustrates an example of an air vent hole of an adhesive-based antenna assembly according to an embodiment of the disclosure.

FIG. 12 illustrates an example of an air vent hole of an adhesive-based antenna assembly according to an embodiment of the disclosure.

Referring to FIG. 12, as described above, the contraction or expansion of air due to heat may cause defect of an antenna assembly in an unpredictable period. The antenna assembly of the disclosure may include an air vent hole to solve the problem.

Referring to FIG. 12, in bonding 1210, an adhesive-based antenna assembly is stacked on a PCB (i.e., a main PCB). An upper substrate (e.g., the FPCB of the second antenna part and the FPCB 613 in FIG. 6) of the adhesive-based antenna assembly may include a hole 1220. The hole 1220 may be formed to discharge air so as to prevent performance deterioration due to an air trap. The hole 1220 may be formed in a space between an area for a radiator and a shielding area (i.e., an area in which a metal pillar is disposed) formed by pillar bonding on one surface of the FPCB.

Unlike the hole 1220, a hole may be disposed in other areas of the FPCB for the same purpose, that is, air ventilation. The air vent hole 1231 may be disposed in a radiator mounting area. The air vent hole 1232 may be disposed at both sides of a radiator in a size smaller than the radiator. Referring to the second example 1243, four air vent holes 1232 may be arranged for each circular radiator (the radiator of the second antenna part) at an interval of 90 degrees. The air vent hole 1233 may be disposed in a space between radiators. Referring to the first example 1241, the air vent holes 1233 may be arranged for each space between a circular radiator (the radiator of the second antenna part) and a circular radiator.

FIG. 13 illustrates an example of separation of an adhesive-based antenna assembly according to an embodiment of the disclosure.

Referring to FIG. 13, rearrangement may be required due to a defect after an adhesive-based antenna assembly is attached to a PCB (i.e., a main board). For example, arrangement between the adhesive-based antenna assembly and a PCB of an RU board may be misaligned. The adhesive-based antenna assembly may be required to be configured to facilitate attachment/detachment for improving production efficiency.

The adhesive-based antenna assembly according to embodiments of the disclosure may include an adhesive material on a lower surface (e.g., the FPCB of the first antenna part) thereof. The adhesive material may include the first PSA 603 in FIG. 6. The adhesive material may be configured to cause releasing when exposed to a specific temperature environment. For example, the adhesive material may be a material having adhesion at room temperature but losing adhesion at high temperature. By way of example, the adhesive material may be a thermal release tape (or a foaming tape), or the adhesive material may be a foam release-type adhesive tape.

Referring to FIG. 13, a first state 1310 indicates an adhesive-based antenna assembly at room temperature. The adhesive material on the lower surface has adhesion such that the adhesive-based antenna assembly may be bonded to the PCB through the adhesive material. The adhesive-based antenna assembly may be fixed to one surface of the PCB due to the adhesion of the adhesive material of the lower surface. A second state 1330 indicates an adhesive-based antenna assembly at high temperature. The adhesive material of the lower surface may foam at high temperature. The foaming of the adhesive material may cause loss of adhesion of adhesive material. The adhesive-based antenna assembly may be separated from the PCB due to releasing.

Although not shown in FIG. 13, after releasing, the adhesive-based antenna assembly may be bonded to the PCB again through re-arrangement. As such, an RU module may be produced without reproduction of the adhesive-based assembly and the PCB from scratch.

According to embodiments of the disclosure, an antenna assembly may include: a first flexible printed circuit board (FPCB) for multiple first antennas; a second flexible printed circuit board (FPCB) for multiple second antennas; a metal plate including multiple holes; a first adhesive material layer for bonding the metal plate and the first FPCB; and a second adhesive material layer for bonding between the metal plate and the second FPCB, wherein the metal plate is disposed such that the multiple first antennas are located in the multiple holes, respectively and the multiple second antennas to be located in the multiple holes, respectively.

The first adhesive material layer may include multiple first holes equal to the number of the multiple holes of the metal plate, and the second adhesive material layer may include multiple second holes equal to the number of the multiple holes of the metal plate.

The first adhesive material layer may be disposed such that the multiple first antennas are respectively located in the first multiple holes with reference to the first adhesive material layer, and the second adhesive material layer may be disposed such that the multiple second antennas are respectively located in the second multiple holes with reference to the second adhesive material layer.

The first FPCB and the second FPCB may include one or more air-vent holes for discharging air.

The one or more air-vent holes may be formed in an area of one surface of the second FPCB excluding an area in which the multiple second antennas are arranged, and an area bonded to the second adhesive material layer.

A first surface of the second FPCB, on which the multiple second antennas are arranged may be disposed to face a first surface of the first FPCB on which the multiple first antennas are arranged.

A thickness of the first adhesive material layer may be thinner than a thickness of each of the multiple first antennas.

The antenna assembly may not include a cover layer for each of the multiple first antennas and the multiple second antennas.

The antenna assembly may further include a third adhesive material layer to be bonded to a printed circuit board (PCB) of a radio unit (RU), and the third adhesive material layer may be bonded to a second surface of the first FPCB opposite to the first surface of the first FPCB on which the first multiple antennas are arranged.

The third adhesive material layer may be configured to maintain adhesion in a first temperature range and to lose adhesion in a second temperature range not overlapping the first temperature range.

According to embodiments of the disclosure, a radio unit (RU) module may include: a printed circuit board (PCB) and multiple antenna assemblies, and an antenna assembly of the multiple antenna assemblies may include: a first flexible printed circuit board (FPCB) for multiple first antennas; a second flexible printed circuit board (FPCB) for multiple second antennas; a metal plate including multiple holes; a first adhesive material layer for bonding between the metal plate and the first FPCB; and a second adhesive material layer for bonding the metal plate and the second FPCB, wherein the metal plate is disposed such that the multiple first antennas are located in the multiple holes, respectively and the multiple second antennas to be located in the multiple holes, respectively.

The first adhesive material layer may include multiple first holes equal to the number of the multiple holes of the metal plate, and the second adhesive material layer may include multiple second holes equal to the number of the multiple holes of the metal plate.

The first adhesive material layer may be disposed such that the multiple first antennas are respectively located in the first multiple holes with reference to the first adhesive material layer, and the second adhesive material layer may be disposed such that the multiple second antennas are respectively located in the second multiple holes with reference to the second adhesive material layer.

The first FPCB and the second FPCB may include one or more air-vent holes for discharging air.

The one or more air-vent holes may be formed in an area of one surface of the second FPCB excluding an area in which the multiple second antennas are arranged, and an area bonded to the second adhesive material layer.

A first surface of the second FPCB, on which the multiple second antennas are arranged, may be disposed to face a first surface of the first FPCB on which the multiple first antennas are arranged.

A thickness of the first adhesive material layer may be thinner than a thickness of each of the multiple first antennas.

The antenna assembly may omit a cover layer for each of the multiple first antennas and the multiple second antennas.

The antenna assembly may further include a third adhesive material layer to be bonded to the PCB, and the third adhesive material layer may be bonded to a second surface of the first FPCB opposite to the first surface of the first FPCB on which the first multiple antennas are arranged.

The third adhesive material layer may be configured to maintain adhesion in a first temperature range and to lose adhesion in a second temperature range not overlapping the first temperature range.

Figure 14:
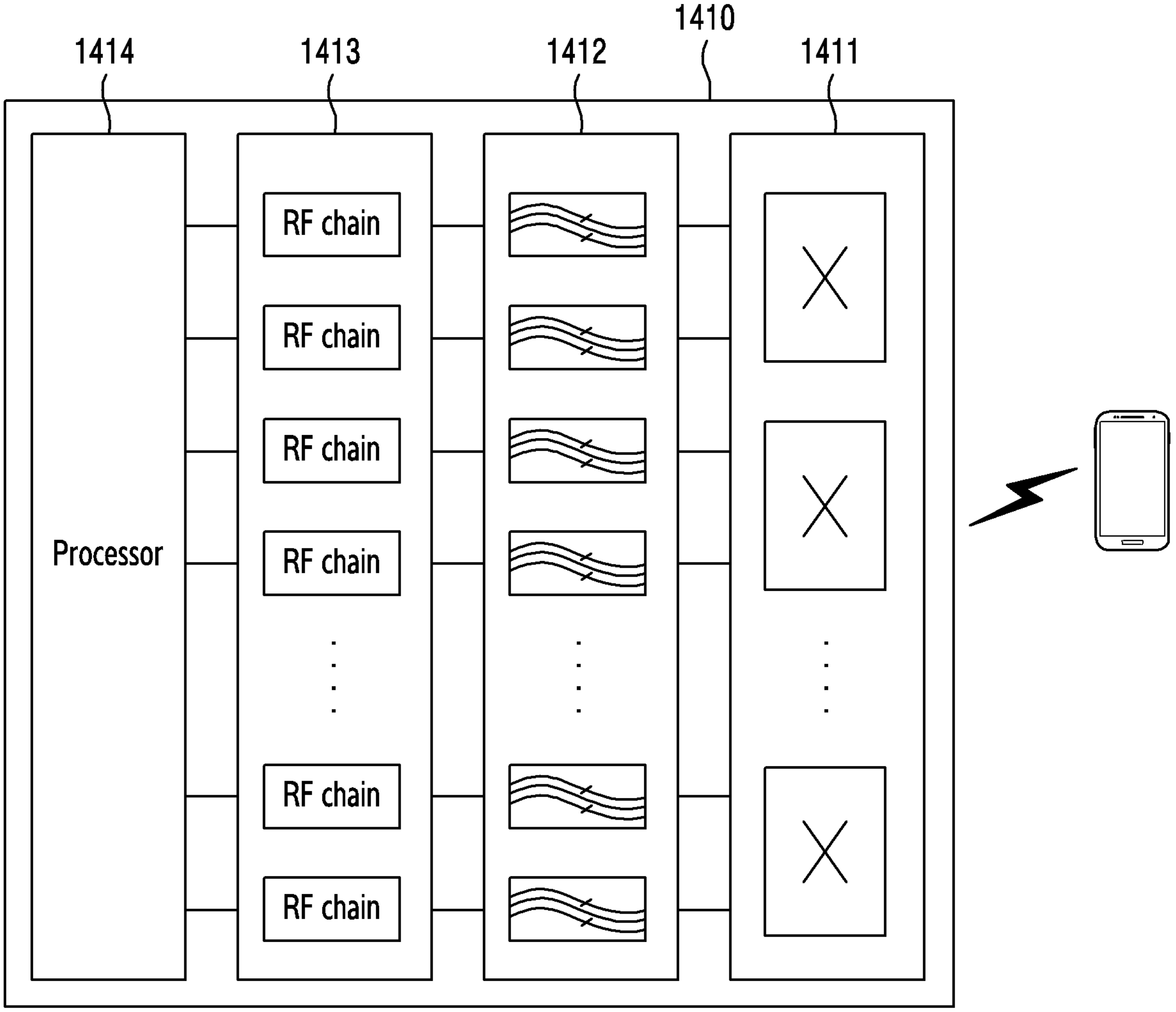
FIG. 14 illustrates a functional configuration of an electronic device including an adhesive-based antenna assembly according to an embodiment of the disclosure.

FIG. 14 illustrates a functional configuration of an electronic device including an adhesive-based antenna assembly according to an embodiment of the disclosure.

Referring to FIG. 14, the electronic device 1410 may correspond to one of the base station 110 or the terminal 120 in FIG. 1. According to an embodiment, the electronic device 1410 may correspond to a base station device configured to support mmWave communication (e.g., frequency range 2 in 3GPP). The embodiments of the disclosure include the antenna structure mentioned with reference to FIGS. 1, 2A, 2B, 3A, 3B, 4, 5A, 5B, and 6 to 13 as well as the electronic device including the antenna structure. The electronic device 1410 may include an RF equipment having an air-based feeding structure.

FIG. 14 shows a functional configuration of the electronic device 1410. The electronic device 1410 may include an antenna part 1411, a power interface part 1412, a radio frequency (RF) processor 1413, and a controller 1414.

The antenna part 1411 may include multiple antennas. The antenna performs a function for transmitting or receiving a signal through a wireless channel. The antenna may include a radiator formed of a conductor or a conductive pattern formed on a substrate (e.g., a PCB). The antenna may radiate an up-converted signal on a wireless channel or obtain a signal radiated by other devices. Each antenna may be referred to as an antenna element or an antenna component. In some embodiments, the antenna part 1414 may include an antenna array in which multiple antenna elements form an array. The antenna part 1411 may be electrically connected to the power interface part 1412 through RF signal lines. The antenna part 1414 may be mounted on a PCB including multiple antenna elements. The antenna part 1411 may be mounted on a FPCB. The antenna part 1411 may provide a received signal to the power interface part 1412 or radiate a signal provided by the power interface part 1412 into the air.

The power interface part 1412 may include a module and parts. The power interface part 1412 may include one or more IFs. The power interface part 1412 may include one or more LOs. The power interface part 1412 may include one or more LDOs. The power interface part 1412 may include one or more DC/DC converters. The power interface part 1412 may include one or more DFEs. The power interface part 1412 may include one or more FPGAs. The power interface part 1412 may include one or more connectors. The power interface part 1412 may include a power supplier.

The power interface part 1412 may include areas for one or more antenna modules mounted thereon. For example, the power interface part 1412 may include multiple antenna modules for supporting MIMO communication. An antenna module according to the antenna part 1414 may be mounted to the corresponding areas. The power interface part 1412 may include a filter. The filter may perform filtering for transferring a signal of a desired frequency. The power interface part 1412 may include a filter. The filter may perform a function to selectively identify a frequency by generating a resonance. The power interface part 1412 may include at least one of a band pass filter, a low pass filter, a high pass filter, or a band reject filter. That is, the power interface part 1412 may include RF circuits for obtaining signals in a frequency band for transmission or a frequency band for reception. The power interface part 1412 according to various embodiments may electrically connect the antenna part 1414 and the RF processor 1413.

The RF processor 1413 may include multiple RF processing chains. The RF chain may include multiple RF elements. The RF elements may include an amplifier, a mixer, an oscillator, a DAC, an ADC, and the like. The RF processing chain may correspond to an RFIC. For example, the RF processor 1413 may include an up converter for up-converting a digital transmission signal in a baseband into a transmission frequency and a digital-to-analog converter for converting an up-converted digital transmission signal into an analog RF transmission signal. The up converter and the DAC form a portion of a transmission path. The transmission path may further include a power amplifier (PA) or a coupler (or combiner). In addition, for example, the RF processor 1413 may include an analog-to-digital converter (ADC) for converting an analog RF reception signal into a digital reception signal and a down converter for down-converting a digital reception signal into a digital reception signal in a ground band. The ADC and the down converter form a portion of a reception path. The reception path may further include a low-noise amplifier (LNA) or a coupler (or divider). RF components of the RF processor may be implemented on a PCB. The base station 1410 may include a structure in which the antenna part 1414, the power interface part 1412, and the RF processor 1413 are sequentially stacked. Antennas, RF components of the power interface part, and the RFICs may be implemented on separate PCBs and filters between PCBs may be repeatedly coupled to each other to form multiple layers.

The processor 1414 may control general operations of the electronic device 1410. The processor 1414 may include various modules for performing communication. The processor 1414 may include at least one processor such as a modem. The processor 1414 may include modules for digital signal processing. For example, the processor 1414 may include a modem. When transmitting data, the processor 1414 may generate complex symbols by coding and modulating a transmission bit stream. In addition, for example, when data is received, the processor 1414 may restore a bit stream by demodulating and decoding a baseband signal. The processor 1414 may perform functions of a protocol stack required by a communication standard.

Referring to FIG. 14, a functional configuration of the electronic device 1410 is described as equipment for which the antenna structure of the disclosure may be utilized. However, the example shown in FIG. 14 is merely a configuration for the utilization of the RF filter structure according to various embodiments of the disclosure described through FIGS. 1, 2A, 2B, 3A, 3B, 4, 5A, 5B, and 6 to 14, and the embodiments of the disclosure are not limited to the components of the equipment shown in FIG. 14. Accordingly, an antenna module including an antenna structure, other type of communication equipment, and an antenna structure itself may also be understood as embodiments of the disclosure.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna assembly comprising:

a first flexible printed circuit board (FPCB) for multiple first antennas;

a second flexible printed circuit board (FPCB) for multiple second antennas;

a metal plate including multiple holes;

a first adhesive material layer for bonding between the metal plate and the first FPCB; and a second adhesive material layer for bonding between the metal plate and the second FPCB, wherein the metal plate is disposed such that the multiple first antennas are located in the multiple holes, respectively and the multiple second antennas are located in the multiple holes, respectively.

2. The antenna assembly of claim 1, wherein the first adhesive material layer comprises multiple first holes equal to a number of the multiple holes of the metal plate, and wherein the second adhesive material layer comprises multiple second holes equal to the number of the multiple holes of the metal plate.

3. The antenna assembly of claim 2, wherein the first adhesive material layer is disposed such that the multiple first antennas are respectively located in the first multiple holes with reference to the first adhesive material layer, and wherein the second adhesive material layer is disposed such that the multiple second antennas are respectively located in the second multiple holes with reference to the second adhesive material layer.

4. The antenna assembly of claim 1, wherein the first FPCB and the second FPCB comprise one or more air-vent holes for discharging air.

5. The antenna assembly of claim 4, wherein the one or more air-vent holes are formed in an area of one surface of the second FPCB excluding an area in which the multiple second antennas are arranged and an area bonded to the second adhesive material layer.

6. The antenna assembly of claim 1, wherein a first surface of the second FPCB, on which the multiple second antennas are arranged, is disposed to face a first surface of the first FPCB, on which the multiple first antennas are arranged.

7. The antenna assembly of claim 1, wherein a thickness of the first adhesive material layer is thinner than a thickness of each of the multiple first antennas.

8. The antenna assembly of claim 1, wherein the antenna assembly does not comprise a cover layer for each of the multiple first antennas and the multiple second antennas.

9. The antenna assembly of claim 1, further comprising:

a third adhesive material layer to be bonded to a printed circuit board (PCB) of a radio unit (RU), wherein the third adhesive material layer is bonded to a second surface of the first FPCB opposite to a first surface of the first FPCB, on which the first multiple antennas are arranged.

10. The antenna assembly of claim 9, wherein the third adhesive material layer is configured to:

maintain adhesion in a first temperature range; and lose adhesion in a second temperature range not overlapping the first temperature range.

11. A radio unit (RU) module comprising:

a printed circuit board (PCB); and multiple antenna assemblies, wherein an antenna assembly of the multiple antenna assemblies comprises:

a first flexible printed circuit board (FPCB) for multiple first antennas, a second flexible printed circuit board (FPCB) for multiple second antennas, a metal plate including multiple holes, a first adhesive material layer for bonding between the metal plate and the first FPCB, and a second adhesive material layer for bonding between the metal plate and the second FPCB, and wherein the metal plate is disposed such that the multiple first antennas are located in the multiple holes, respectively and the multiple second antennas are located in the multiple holes, respectively.

12. The RU module of claim 11, wherein the first adhesive material layer comprises multiple first holes equal to a number of the multiple holes of the metal plate, and wherein the second adhesive material layer comprises multiple second holes equal to the number of the multiple holes of the metal plate.

13. The RU module of claim 12, wherein the first adhesive material layer is disposed such that the multiple first antennas are respectively located in the first multiple holes with reference to the first adhesive material layer, and wherein the second adhesive material layer is disposed such that the multiple second antennas are respectively located in the second multiple holes with reference to the second adhesive material layer.

14. The RU module of claim 11, wherein the first FPCB and the second FPCB comprise one or more air-vent holes for discharging air.

15. The RU module of claim 14, wherein the one or more air-vent holes are formed in an area of one surface of the second FPCB excluding an area in which the multiple second antennas are arranged, and an area bonded to the second adhesive material layer.

16. The RU module of claim 11, wherein a first surface of the second FPCB, on which the multiple second antennas are arranged, is disposed to face a first surface of the first FPCB, on which the multiple first antennas are arranged.

17. The RU module of claim 11, further comprising:

multiple array antennas.

18. The RU module of claim 17, wherein the multiple array antennas are arranged on one side of the RU module.

19. The RU module of claim 17, wherein at least one of the multiple array antennas includes a plurality of sub arrays.

20. The RU module of claim 11, wherein the first FPCB includes a first radiator, and wherein the second FPCB includes a second radiator.

* * * * *